(12) United States Patent
Watling

(10) Patent No.: US 11,225,116 B2
(45) Date of Patent: Jan. 18, 2022

(54) AMPHIBIOUS MULTI-TERRAIN WATER PLANING HIGH SPEED TRACKED VEHICLE

(71) Applicant: Shawn Watling, Warsaw (CA)

(72) Inventor: Shawn Watling, Warsaw (CA)

( * ) Notice: Subject to any disclaimer, the term of this patent is extended or adjusted under 35 U.S.C. 154(b) by 0 days.

(21) Appl. No.: 16/488,086

(22) PCT Filed: Feb. 12, 2018

(86) PCT No.: PCT/CA2018/050155
§ 371 (c)(1),
(2) Date: Aug. 22, 2019

(87) PCT Pub. No.: WO2018/152623
PCT Pub. Date: Aug. 30, 2018

(65) Prior Publication Data
US 2020/0062059 A1 Feb. 27, 2020

Related U.S. Application Data

(60) Provisional application No. 62/463,068, filed on Feb. 24, 2017, provisional application No. 62/562,789, filed on Sep. 25, 2017.

(51) Int. Cl.
*B60F 3/00* (2006.01)
*B60K 17/16* (2006.01)
(Continued)

(52) U.S. Cl.
CPC ............ *B60F 3/0015* (2013.01); *B60K 17/16* (2013.01); *B60K 17/342* (2013.01);
(Continued)

(58) Field of Classification Search
CPC .......... B60F 3/00; B60F 3/007; B60F 3/0015; B60F 3/003; B60F 3/0038; B60F 3/0046;
(Continued)

(56) References Cited

U.S. PATENT DOCUMENTS 3,108,564 A * 10/1963 Prosser ................. B60F 3/0015
440/12.63
3,112,727 A * 12/1963 Kiefer .................. B62D 55/247
440/12.63
(Continued)

FOREIGN PATENT DOCUMENTS

GB 2448186 A 8/2008
WO 2018152623 A1 8/2018

OTHER PUBLICATIONS

International Search Report of PCT/CA2018/050155 dated Feb. 12, 2018.
(Continued)

*Primary Examiner* — Daniel V Venne
(74) *Attorney, Agent, or Firm* — Joseph F. Murphy; Langer, Grogan and Diver, P.C.

(57) ABSTRACT

An amphibious multi-terrain water planing vehicle including: a. a hull having a top, a bottom, a front end, a rear end, a first side and a second side; b. at least one track frame, in exemplary embodiments a pair of track frames, mounted to the hull; c. a sole propulsion and water planing device including at least one continuous rotatable track having an outside surface and an inside surface, in exemplary embodiments a pair of continuous rotatable tracks, mounted to the at least one track frame, in exemplary embodiments each of the pair of continuous rotatable tracks mounted to each of the pair of track frames; the at least one continuous rotatable track, in exemplary embodiments the pair of continuous rotatable tracks not vertically adjustable relative to the hull wherein the vehicle when transitioning from land to water and vice versa requiring no modification, and wherein the vehicle is able to plane on water from a stand still position.

70 Claims, 33 Drawing Sheets

(51) Int. Cl.
*B60K 17/342* (2006.01)
*B62D 11/10* (2006.01)
*B62D 55/06* (2006.01)
*B63H 1/34* (2006.01)
*B63H 25/42* (2006.01)

(52) U.S. Cl.
CPC ............ *B62D 11/105* (2013.01); *B62D 55/06* (2013.01); *B63H 1/34* (2013.01); *B63H 25/42* (2013.01); *B60G 2300/28* (2013.01); *B60G 2300/32* (2013.01)

(58) Field of Classification Search
CPC ...... B60F 3/0061; B60F 3/0069; B60K 17/16; B60K 17/342; B62D 11/105; B62D 55/06; B60G 2300/28; B60G 2300/32; B63H 1/34; B63H 25/42
USPC .................................. 440/12.5, 12.63, 12.64
See application file for complete search history.

(56) References Cited

U.S. PATENT DOCUMENTS

| | | | | |
|---|---|---|---|---|
| 3,180,305 | A * | 4/1965 | Gower-Rempel | B60W 10/06 440/12.56 |
| 3,306,250 | A * | 2/1967 | Pitchford | B63H 1/34 440/12.54 |
| 3,534,701 | A * | 10/1970 | Hebert | B60F 3/0076 440/12.56 |
| 3,559,611 | A * | 2/1971 | Cushman | B60F 3/0007 440/12.63 |
| 3,760,763 | A * | 9/1973 | Brusacoram | B60F 3/0069 440/12.64 |
| 3,976,025 | A * | 8/1976 | Russell | B60F 3/0015 440/12.56 |
| 4,735,598 | A | 4/1988 | Moroto et al. | |
| 4,961,395 | A | 10/1990 | Coast | |
| 5,027,737 | A | 7/1991 | Duffy et al. | |
| 5,755,173 | A | 5/1998 | Rorabaugh et al. | |
| 6,149,474 | A | 11/2000 | Olkowski, Jr. | |
| 6,582,258 | B2 * | 6/2003 | Morin | B60F 3/0015 305/165 |
| 6,921,304 | B2 * | 7/2005 | Hewitt | B60F 3/0015 305/120 |
| 7,316,594 | B2 * | 1/2008 | Longdill | B60G 3/24 440/12.5 |
| 7,670,200 | B2 * | 3/2010 | Wilson | B60F 3/0015 440/12.63 |
| 8,002,596 | B2 | 8/2011 | Wernicke et al. | |
| 9,821,844 | B2 | 11/2017 | Watling | |
| 2016/0016608 | A1 | 1/2016 | Watling | |
| 2016/0339957 | A1 | 11/2016 | Watling | |

OTHER PUBLICATIONS

Kilgore, Ullmann, "Hydrodynamic Aspects of Tracked Amphibians", May 1969.

Savitsky, Daniel, "Hydrodynamic Design of Planing Hulls", Marine Technology, Oct. 1964, vol. 1, No. 1 pp. 71-95.

Kaiser, Md. Shahidullah et al., "Effect of Whisker Spray on Power of High Speed Planing Hull" International Journal of Science and Research, Jun. 2019, vol. 8, Issue 6.

* cited by examiner

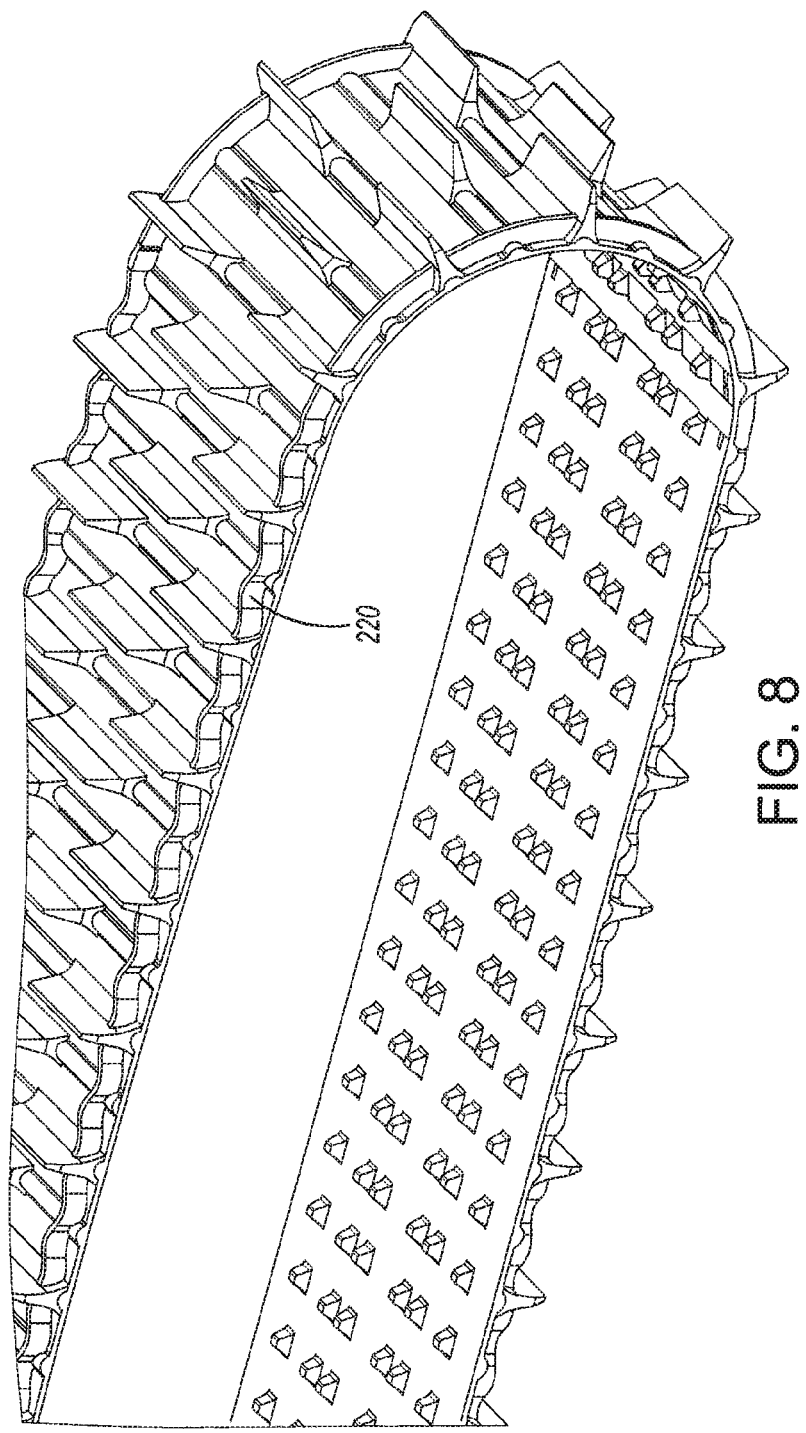

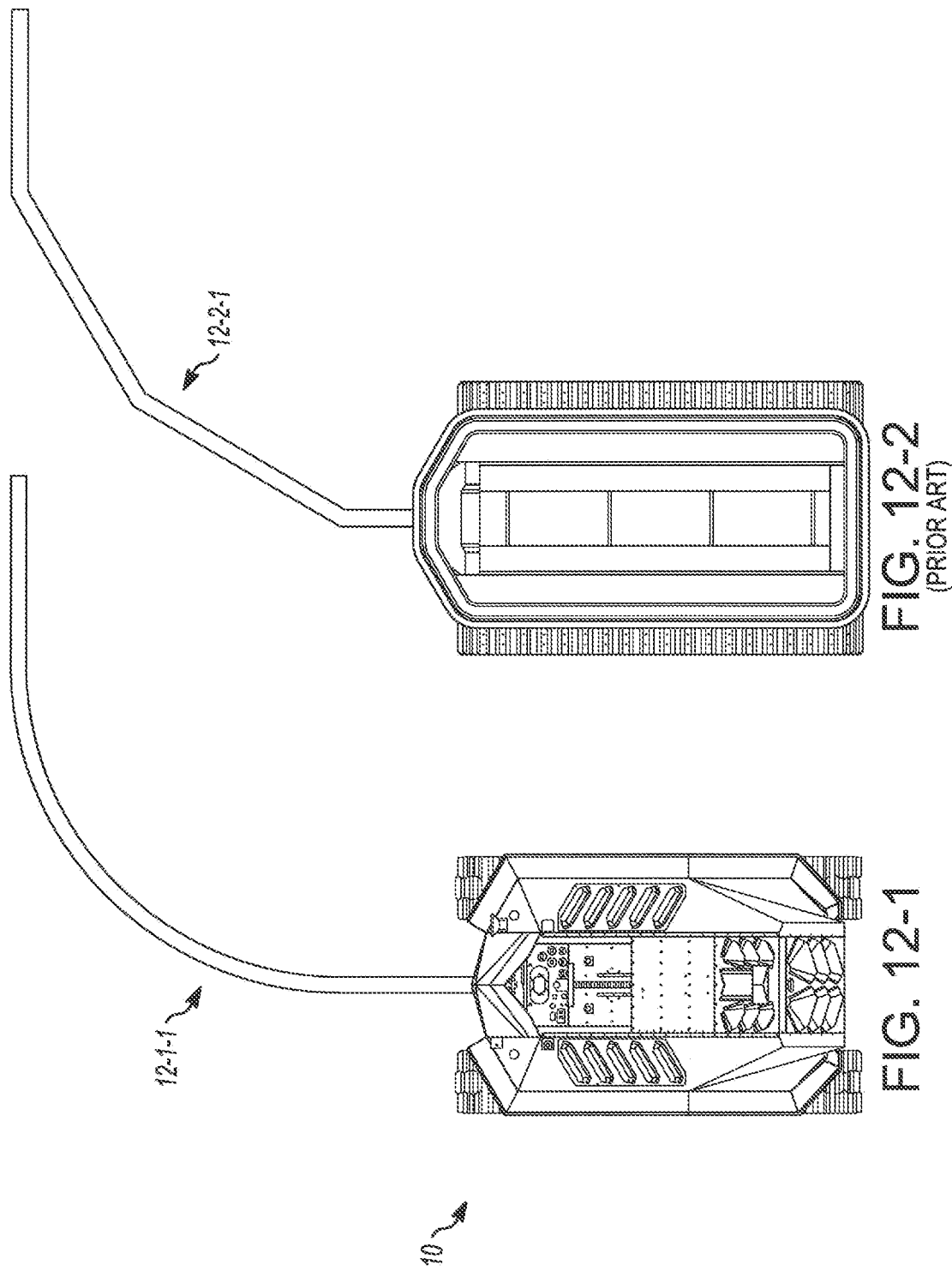

AMPHIBIOUS MULTI-TERRAIN WATER PLANING HIGH SPEED TRACKED VEHICLE

CROSS-REFERENCE TO RELATED APPLICATIONS

This application is a U.S. National Phase Application of PCT/CA2018/050155, filed Feb. 12, 2018, which claims priority to U.S. Provisional Patent Application Nos. 62/463,068, filed Feb. 24, 2017 and 62/562,789, filed Sep. 25, 2017, the contents of which applications are incorporated by reference herein in their entireties for all purposes.

BACKGROUND OF THE INVENTION

Field of the Disclosure

The present disclosure relates to amphibious multi-terrain water planing high speed tracked vehicles with a seamless no down time nor modification required when travelling from land to water and vice versa.

Background

There have been many attempts to create an amphibious multi-terrain vehicle.

Hovercrafts and airboats have poor directional control on water and perform poorly on land, in particular when negotiating steep slopes. Hovercraft produce significant prop wash (a current of water or air created by the action of a propeller or rotor) resulting in noise levels that are disruptive to surroundings. The water and/or sand blowing at high speeds towards humans proximate the hovercraft may further result in a dangerous situation to humans. Hovercrafts perform poorly when negotiating steep sloped terrain and are thus limited to relatively flat and level terrain. Due to the nature of hovercrafts following the curvature of the earth when travelling, steering lacks precise control, especially in high wind conditions, causing safety issues. The flexible skirts of the hovercraft are a high maintenance item. Due to high fuel consumption and constant full throttle operation, frequent engine rebuilds are typical. The price of hovercrafts is significant and not within the budget of the average consumer.

The Amphibious Combat Vehicle (ACV) has been used by the military for several decades. A jet drive is used for water propulsion averaging 8 kmh-1 and a maximum speed of 14 kmh-1 on water at 1200 hp. However, the computer brake steer system is inefficient and the lack of precise steering control limits land speed to 80 kmh-1.

Furthermore, current amphibious vehicles require either a transition time when moving from land to water or vice versa and/or time to modify the vehicle to adapt to the surface of choice.

U.S. Pat. No. 6,149,474 to Olkowski describes a vehicle propulsion system intended for a personal amphibious vehicle capable of efficiently traversing water, snow, land, ice and the like. There is no discussion about the vehicle planing on water from a still position. Furthermore, Olkowski describes the use of channels along the tracks to direct water flow to an enhanced vertical thrust lift water flow cavity. Water purportedly is to flow along a belt portion defined by belt blades, upward to a cavity along the top of the belt and out a discharge port. Channeling water in this manner increases drag and reduces speed along the water resulting in the opposite desired effect (i.e. reduced drag and high speed along water travel). Finally, there is no discussion of the vehicle being buoyant. Although there is discussion of two inflatable rollers associated with the vehicle, reference to buoyancy or floating ability of the vehicle as well as the ability of the vehicle to plane on water commencing from a stopped position in water is neither described nor disclosed.

U.S. Pat. No. 8,002,596 to Wernicke et al. describes a high water-speed tracked amphibian with tracks movable between an upper position and a lower position relative to the hull. Wernicke et al. includes two aft water diverter vanes to reduce water carried forward by the upper run of the track as well as a retractable forward vane to be retracted when not in the water. Wernicke also requires a transom flap, at the rear of the vehicle, to be deployed prior to and when travelling on water and retracted prior to and when travelling on land, and along with the suspension height must be changed to transition from land to water and vice versa. The required transition elements require time to modify the vehicle from land to water use, and vice versa and prevent use of the vehicle for towing and for use on muddy, snowy and rocky terrain, as well as use on logs and off road use in general. This transition time leads to down time while operating the vehicle and greater risk of damage to the vehicle if the transition elements are not in the proper positions during travel on the various terrains. Finally, the Wernicke vehicle is estimated to cost in the range of $250,000 USD, which places it out of the range of the average consumer of a personal amphibious vehicle.

Gibbs Quadski™ amphibious vehicle (see https://en.wikipedia.org/wiki/Gibbs_Quadski) is a wheeled vehicle and requires a 5 to 10 second pause to transition from land to water (wheels need to retract) and must enter and exit water slowly coming to a near complete stop during transition to and/or from water/land. Furthermore, the Gibbs Quadski amphibious vehicle has a top speed of 72 kmh-1.

The Argo™ is a 6 or 8 wheeled vehicle with slower (max 5 kmh-1 water, 27 kmh-1 on land according to latest brochure specs) water speeds than the Gibbs Quadski™. The Argo™ does not have the ability to plane on water from a standstill position in water.

The above amphibious vehicles exhibit low performance and high cost when compared to purpose built vehicles (i.e. snowmobile for snow terrain, ATV's for land, Sea-Doos™ for water).

There is a need for an amphibious vehicle that does not require transition time to convert the vehicle from land to water and vice versa (i.e. ship to shore).

There is also a need for an amphibious vehicle requiring no special devices or mode changes when moving from various terrains or uses.

There is also a need for an amphibious vehicle safely able to attain high speed on water and land.

There is also a need for an amphibious vehicle able to plane on water from a standing start position in the water.

There is also a need for a track based amphibious vehicle.

There is also a need for an amphibious vehicle with improved steering control on various terrain including land, water, ice, snow, mud, rocks and the like.

There is also a need for an amphibious vehicle with the improved ability to start and stop on land, mud, snow, ice and water.

There is also a need for an amphibious vehicle with improved rider comfort and smooth operation.

There is also a need for an amphibious vehicle with no specialized driver skill requirement, particularly when negotiating steep terrain on snow (no special weight transfer skills required).

There is also a need for an amphibious vehicle with the ability to tow objects or other vehicles.

There is also a need for a vehicle with a variable ratio differential, in exemplary embodiments an all mechanical variable ratio differential to replace a transmission and differential in a vehicle.

SUMMARY

According to one aspect, there is provided a tracked amphibious multi-terrain water planing vehicle comprising:
a. a hull having a top, a bottom, a front end, a rear end, a first side and a second side;
b. at least one track frame, in exemplary embodiments a pair of track frames, mounted to said hull, in exemplary embodiments one of said pair of track frames is mounted to said first side of said hull and the other of said pair of track frames is mounted to said second side of said hull;
c. a propulsion, in exemplary embodiments a sole propulsion and water planing means comprising at least one continuous rotatable track having an outside surface and an inside surface, in exemplary embodiments a pair of continuous rotatable tracks, mounted to said at least one track frame, in exemplary embodiments each of said pair of continuous rotatable tracks mounted to each of said pair of track frames; said at least one continuous rotatable track, in exemplary embodiments said pair of continuous rotatable tracks, in one embodiment not vertically adjustable relative to said hull; and
d. a drive system for driving said at least one continuous rotatable track, in exemplary embodiments for driving said pair of continuous rotatable tracks;
e. said drive system further for driving a steering system; wherein said vehicle when transitioning from land to water and vice versa requiring no modification and wherein said vehicle is configured to plane on water while in motion, commencing from a stand still position in water.

In another embodiment, said pair of continuous rotatable tracks are vertically adjustable relative to said hull.

According to one embodiment, said hull is buoyant.

According to yet another embodiment, said at least one track frame, in exemplary embodiments said pair of track frames, is buoyant.

According to yet another embodiment, said hull and said at least one track frame, in exemplary embodiments said pair of track frames, are buoyant.

According to yet another embodiment, said at least one continuous rotatable track, in exemplary embodiments said pair of continuous rotatable tracks, provides lift and thrust when planing on water.

According to yet another embodiment, said hull along with said at least one continuous rotatable track, in exemplary embodiments said hull along with said pair of continuous rotatable tracks, provide lift of said vehicle when travelling along water.

According to yet another embodiment, said hull of said vehicle while travelling on water, after planing out, is not in contact with said water and said at least one continuous rotatable track, in exemplary embodiments said pair of continuous rotatable tracks are the sole lift producing means and propulsion means along the water, in exemplary embodiments maintaining planing and no loss of speed on water.

According to yet another embodiment, said at least one continuous rotatable track, in exemplary embodiments said pair of continuous rotatable tracks combined, have a track width to overall vehicle width ratio of from about 0.4:1 to about 0.95:1, in exemplary embodiments from about 0.5:1 to about 0.95:1, and in exemplary embodiments from about 0.6:1 to about 0.95:1.

According to yet another embodiment, said vehicle has a ratio of lift producing track width to lift producing hull width of from about 0.5:1 to about 12:1, in exemplary embodiments about 1.23:1.

In exemplary embodiments, said at least one rotatable continuous track, in exemplary embodiments each of said pair of continuous rotatable tracks comprise a belt portion and a plurality of spaced track lugs on said belt portion extending from an outer surface of said track wherein each of said plurality of spaced track lugs have a track lug height (depth) of at least about 1.6 inches (4.06 cm), in exemplary embodiments at least about 2.5 inches (6.35 cm). It has been found tall lugs reduce track slip and increases thrust (propulsion) while travelling in water. Track lug height (depth) may vary as desired. In a preferred embodiment, track lug height (depth) increases as the weight and/or size of the amphibious vehicle increases.

According to yet another embodiment, each of said track lugs has a triangle-like profile. In one example, said triangle-like profile is an isosceles triangle. In yet another example, said isosceles triangle has an angle formed at a point of each of said track lug distant said belt portion from about 30 degrees to about 120 degrees. In another example, said triangle-like profile is a scalene triangle. In another example, said triangle-like profile is selected from at least one of the group consisting of a right angle triangle, an obtuse angle triangle, an acute angle triangle and combinations thereof. In another embodiment, said track lugs have a truncated peak.

According to yet another embodiment, each of said track lugs has at least one triangle-like side that is curved (i.e. concave, convex). In another embodiment, each of said track lugs has two triangle-like sides that are curved.

According to yet another embodiment, said triangle-like profile of said track lug has a lead triangle side (lead face of track lug) at an angle when proximate the water surface, promoting movement of water on said lead triangle side away from said track, assisting in propulsion of said vehicle in a desired direction.

According to yet another embodiment, each of said track lugs proximate each of the sides of said belt portion is taller and/or shorter than each of said track lugs proximate the centre of said belt portion.

According to yet another embodiment, said at least one continuous rotatable track, in exemplary embodiments each of said pair of continuous rotatable tracks, further comprise a side flange, in exemplary embodiments a plurality of side flanges, in exemplary embodiments extending outward, in exemplary embodiments extending normal, from the outer surface of said at least one continuous rotatable track, in exemplary embodiments from the outer surface of each of said pair of continuous rotatable tracks, and in exemplary embodiments along each side of the at least one continuous rotatable track, in exemplary embodiments along each side of each of said pair of continuous rotatable tracks, forming an inner side wall and an outer side wall along the length of the at least one continuous rotatable track, in exemplary embodiments forming an inner side wall and an outer side wall along the length of each of said pair of continuous rotatable tracks. In an exemplary embodiment, said side flange is integral with said belt portion. In yet another exemplary embodiment, said side flange is detachable from said belt portion. In an exemplary embodiment, each side flange has a height lower than the height of each of said track lugs when travelling on land. In another exemplary embodiment, each side flange has a height higher than the height of each of said track lugs when travelling on water. In yet another exemplary embodiment, each side flange has a height equivalent to the height of each of said track lugs.

In an exemplary embodiment, said side flange is deformable (or flexible) without tearing when said belt portion is bent in an arc shape or the like, and said side flange is able to retain its normal shape when said belt portion is not bent in an arc shape or the like. In yet another exemplary embodiment, said side flange is "S" in shape. In yet another exemplary embodiment, said side flange is zigzag and/or accordion in shape. In yet another exemplary embodiment, said side flange is serpentine in shape.

According to yet another embodiment, said vehicle further comprises a trailing edge proximate an end thereof and a center of mass, with an angle formed from the trailing edge to the centre of mass of from about 35 degrees or less, in exemplary embodiments from about 35 degrees to about −20 degrees. We have found this range of angles to be effective for an amphibious vehicle able to plane of water when starting from a standstill position in water, without additional lift devices or the like on said vehicle.

According to yet another embodiment, said vehicle further comprises a center of mass and center of buoyancy proximate one another such that any lift producing surface of said vehicle is optimal for planing on water, without the need for external retractable devices to increase lift surface of said vehicle.

According to yet another embodiment, said vehicle further comprises a continuously variable speed transmission and steering differential as described in published U.S. 20160339957. In a preferred embodiment, said continuously variable speed transmission and steering differential comprising a central drive axle, two pairs of sheaves and two shift arms. The drive axle is driven by an external power source. The two pairs of sheaves, left and right, are mounted to the drive axle. Each pair of sheaves includes a fixed drive sheave and a movable drive sheave. Each movable drive sheave is positioned by a shift arm. Shifting the shift arms left or right varies the gear ratio between the left and right pair of sheaves thereby providing steering control. Narrowing the distance between the shift arms increases the gear ratio and consequently puts the transmission into a higher gear, thereby providing speed control.

In an exemplary embodiment, said continuously variable speed transmission and steering differential comprises:

a. a laterally extending central drive axle rotatably driven by a power source;

b. two pairs of drive sheaves namely a left and right pair, mounted to the drive axle; wherein each pair of drive sheaves includes a fixed drive sheave and a laterally moveable drive sheave along the drive axle;

c. a means for transmitting rotational energy from the left drive sheaves to a left driven axle and from the right drive sheaves to a right driven axle;

d. two spaced apart longitudinally extending shift arms connected to the moveable drive sheaves for controlling the positioning of the moveable drive sheaves;

e. wherein narrowing or increasing the gap between the shift arms narrows or increases respectively the gap between each pair of drive sheaves and increases or decreases the gear ratio which increases or decreases the speed of the driven axles, thereby providing speed control;

f. wherein shifting the shift arms either left or right varies the gear ratio between the left and right pair of sheaves which provides differential speed between the left and right driven axles thereby providing steering control; therefore speed control and steering control is simultaneously and independently effected by controlling the position of the shift arms.

Exemplary embodiments further including;

a. the transmitting means includes two pairs of driven sheaves namely a left and right pair, mounted to the left and right driven axles respectively rotationally connected to the left and right pair of drive sheaves respectively;

b. wherein each pair of driven sheaves includes a fixed driven sheave and a moveable driven sheave such that the gap between the pair of driven sheaves changes inversely proportionally to the gap of the pair of the corresponding drive sheaves.

In an exemplary embodiment, the shift arms are longitudinally extending spaced apart parallel members.

In an exemplary embodiment, the shift arms are planar bars.

In an exemplary embodiment, the shift arms are connected with at least one ball screw shaft extending perpendicular to the shift arms for controlling the lateral spacing between the shift arms by rotating the ball screw shaft.

In an exemplary embodiment, the shift arms are connected with two spaced apart ball screw shafts extending perpendicular to the shift arms for controlling the lateral spacing between the shift arms by rotating the ball screw shafts.

In an exemplary embodiment, the ball screw shaft rotation is motor driven.

In an exemplary embodiment, the ball screw shaft is motor driven with sprockets mounted onto the end of each ball screw shaft and motor and inter-connected with a chain.

In yet another exemplary embodiment, said continuously variable speed transmission and steering differential further includes a pivoting differential arm shaft connected to each shift arm with differential links such that pivoting the differential arm shaft in one direction varies the gear ratio between the left and right pair of sheaves and pivoting in the opposite direction varies the gear ratio oppositely between the left and right pair.

In exemplary embodiments, the differential arm shaft is connected to at least one differential arm which in turn is connected to a link arm pivoting about a link arm pivot, wherein each end of the link arm is connected to one end of a differential link thereby connecting the differential arm shaft to the shift arms.

In exemplary embodiments, the inner drive sheaves are fixed and the outer drive sheaves are moveable, and the inner driven sheaves are moveable and the outer driven sheaves are fixed.

In exemplary embodiments, the differential arm connected to a steering linkage which in turn is connected to a steering control such that actuating the steering control pivots the differential arm thereby providing steering control.

In exemplary embodiments, the drive axle includes a cog pulley connected to a belt for receiving power from a power source.

In exemplary embodiments, the drive axle includes a cog pulley connected to a belt for receiving power from a power source.

In exemplary embodiments, the driven axles are connected to wheels.

In exemplary embodiments, the driven axles are connected to tracks.

In exemplary embodiments, the steering control is a set of pivoting handle bars.

In exemplary embodiments, the power source is an internal combustion motor.

In exemplary embodiments, the transmitting means further includes two v-belts rotationally connecting the left drive sheaves to the left driven sheaves and the right drive sheaves to the right driven sheaves.

According to yet another embodiment, said vehicle further comprises a trailing edge water diverter integral with said hull, in one example a rear fender integral with said hull for reducing water at the trailing edge from recirculating back to said vehicle, in exemplary embodiments for reducing water at the trailing edge from recirculating back into a space defined between said track and said hull, and reducing hydrodynamic drag and/or parasitic drag during planing and/or traveling on water. In another exemplary embodiment, said diverter (or fender) assists in moving water clear of said fender during planing and/or traveling on water. In exemplary embodiments, said diverter (or fender) is proximate the rear end of said hull. In another embodiment, said diverter is located proximate the front end of said hull and/or proximate the rear end of said hull.

In yet another embodiment, said end of said vehicle provides an unobstructed path for water sprayed off said tracks to be directed away from said vehicle and minimizing water sprayed off said tracks contacting said vehicle. In exemplary embodiments, said unobstructed path forms a minimum angle of about 40 degrees from the trailing edge of said tracks to a trailing edge of said vehicle.

In yet another exemplary embodiment, said trailing edge water diverter, more in exemplary embodiments, said integral trailing edge water diverter extends beyond said at least one continuous rotatable track a minimum of about 40 degrees in relation to the angle formed between a wetted lift producing track surface and a tangent line at said trailing edge of a starting point of rotation travel of said track.

In yet another exemplary embodiment, said trailing edge water diverter (or rear fender), in exemplary embodiments said trailing edge water diverter integral with said hull (or rear fender integral with said hull) extends below the surface of the water when said vehicle is in water and reduces surface water flow from feeding into the returning top side of said track. In an exemplary embodiment, said trailing edge water diverter (or rear fender) comprises a flap, in exemplary embodiments, a rubber flap, extending from said diverter (or rear fender) proximate each track, but not touching the track, reducing surface water flow from feeding into the returning top side of said track when traveling in water. In an exemplary embodiment, said water diverter (or rear fender) and flap form an angle from the bottom of the trailing edge of the track from between about 0 degrees to about 90 degrees, in exemplary embodiments, about 30 degrees. In yet another exemplary embodiment, said trailing edge water diverter is proximate said rear end and front end of said vehicle.

In any of the embodiments, said vehicle has a track loading of about 0.80 psi (5.52 kPa) or less calculated by total vehicle weight/total flat track surface area (in contact with a flat surface, in exemplary embodiments a firm flat surface). We have found this track loading value facilitates the distribution of the weight of said vehicle over the largest possible surface area of track to minimize penetration of said vehicle into said surface.

According to yet another embodiment, said vehicle has a track lift producing wetted area having a pressure in the range of from about 0.1 (0.69 kPa) psi to about 1.1 psi (7.58 kPa) at water planing threshold, in exemplary embodiments from about 0.25 psi (1.72 kPa) to about 0.70 (4.83 kPa) psi at water planing threshold. We have found this range facilitates planing of the vehicle on water without additional lifting devices.

In any of the embodiments, said vehicle further comprises a tilt device to facilitate steering of said vehicle. In an exemplary embodiment, said tilt device comprises a suspension allowing each of said tracks to be adjustable in vertical height in relation to each other while maintaining each of said tracks parallel to each other, in exemplary embodiments parallel in both a vertical and horizontal plane, thus allowing the hull to tilt and the vehicle to be steered (or directed) in a desired path of travel. In an exemplary embodiment, said tilt device is manual. In yet another exemplary embodiment, said tilt device is powered. On water, said tilt device steers the vehicle as a result of tilting the tracks relative to the water.

In any of the embodiments, said vehicle further comprises a powered height suspension system.

In an exemplary embodiment, said vehicle further comprises a powered height suspension system and a powered tilt steering device.

According to yet another embodiment, said vehicle has a volume of water contained within a swept path of lift producing track lugs facilitating said vehicle to plane on water without the need of retractable devices or additional lift devices.

According to yet another embodiment, said vehicle has a minimum wetted track volume of water contained within a swept path of lift producing track lugs to vehicle weight of at least about 1.8 cubic inches per pound of vehicle mass (65 cm$^3$/kg). In exemplary embodiments, greater than about 1.8 cubic inches per pound of vehicle mass (65 cm$^3$/kg) allowing for the vehicle when moving on water to plane on water starting from a standstill position in water. Without being bound by theory, it is believed this allows the vehicle to plane on water without requiring retractable devices or additional lift devices to increase surface area on water for planing of a vehicle, allowing said vehicle to plane on water with only track lift surfaces and optionally hull lift surfaces.

According to yet another embodiment, said wetted track volume of water contained within a swept path to vehicle mass is calculated as follows: WTL×TTW×LH/M=in$^3$/lb. (cubic inches of water per pound of vehicle weight) or cm$^3$/kg (cubic centimeters of water per kilogram of vehicle weight), wherein WTL=Wetted Track Length at planing threshold; TTW=Total Track Width; LH=Lug Height and M=Mass of vehicle including operator and fuel. This provides a wetted track volume to vehicle weight ratio. Without being bound by theory, it is believed for a tracked amphibious vehicle to successfully plane on water, a minimum amount of thrust relative to weight is required, as calculated at the planing threshold. In exemplary embodiments, the wetted track volume to vehicle weight ratio is at least 1.8 in$^3$/lb. (65 cm$^3$/kg) or greater.

The planing threshold is a point where the horizontal drag force has reached a peak. Beyond this point, lift force is sufficient to raise the center of mass of the vehicle enough to begin reducing drag, by reducing the volume of water displaced. Due to forward momentum, the volume of water displaced is much more than just the wetted volume of water for the vehicle at rest.

During the planing threshold, the tracks are providing both lift and thrust.

In an exemplary embodiment, said continuous rotatable track is comprised of a plurality of linkable segments. In exemplary embodiments, each linkable segment comprises at least one track lug and at least one side flange, in exemplary embodiments a side flange on each side thereof.

According to yet another embodiment, said vehicle further comprises an enclosure, in exemplary embodiments a covered enclosure, forming part of said vehicle. The enclosure may comprise at least one window and at least one door. In an exemplary embodiment, the enclosure is detachable. In another exemplary embodiment, the vehicle is a full enclosure serving several purposes including protection of the operator, vehicle and contents thereof (including any passengers) should the vehicle experience a rollover, and facilitating the vehicle to self-right in water when required. In another embodiment, the enclosure further replaces the need of a roll bar or roll cage. The structure of the enclosure should be strong and rigid to support the weight of the vehicle and contents thereof in the event of a rollover or the like. A preferred material is Foam Core Carbon Fiber (FCCF) although other materials that minimize any water entering the cabin when the vehicle is not upright to allow auto roll back over to an upright position (i.e. self-righting or auto-righting). The enclosure in exemplary embodiments provides thermal insulation. The enclosure in exemplary embodiments also provides acoustic insulation. The thermal and acoustic insulation provides an increased comfort level to the operator and occupants of the vehicle.

According to yet another embodiment, said vehicle further comprises a parachute connectable to said vehicle. Said parachute allowing for said vehicle to be deployed from the air at a height above the surface (i.e. land, water, ice, etc.) and to safely reach the desired location. In one embodiment, said parachute further comprises a powering system to power said vehicle while in the air to assist in directing said vehicle to the desired location.

According to yet another exemplary embodiment, said vehicle is modular in that the tracks and track frames are detachable from said hull to allow said vehicle to fit in a confined space for transportation and/or storage. Any side fenders attached to said hull may also be detachable from said hull to allow said vehicle to fit in a confined space for transportation and/or storage.

In an exemplary embodiment, said vehicle exhibits at least one of the following characteristics: i) all mechanical differential—no brakes, clutches, hydraulics, motors or computer; ii) precise safe control for high speed steering—naturally goes straight unattended; iii) high efficiency—only air cooling required; iv) differential steering has no engine loading affect—no speed loss to steer; v) cost effective and reliable—single unit transmission and differential; vi) low maintenance—no lubrication required, no gears, long service intervals; vii) smooth and quiet for stealth operation; viii) VRD is compound (2, 4, 6 or 8 belt) for high torque capacity, easy scale up or down; ix) able to carve in water, deep snow and mud at high speed; x) control wheel slip on any surface without ABS brakes—works with one tire off the ground; xi) equal control high speed reverse—planes out on water in reverse; xii) able to parachute onto land or water at high speed for search and rescue missions; xiii) long travel suspension-ideal for high power high speed vehicle (i.e. tank).

BRIEF DESCRIPTION OF THE FIGURES

FIG. 8 is a perspective view of the side track flanges, according to yet another exemplary embodiment.

FIG. 12-1 12-2 depicts a comparison of the prior art trajectory with the present trajectory of the vehicle.

DETAILED DESCRIPTION

Figure 1:
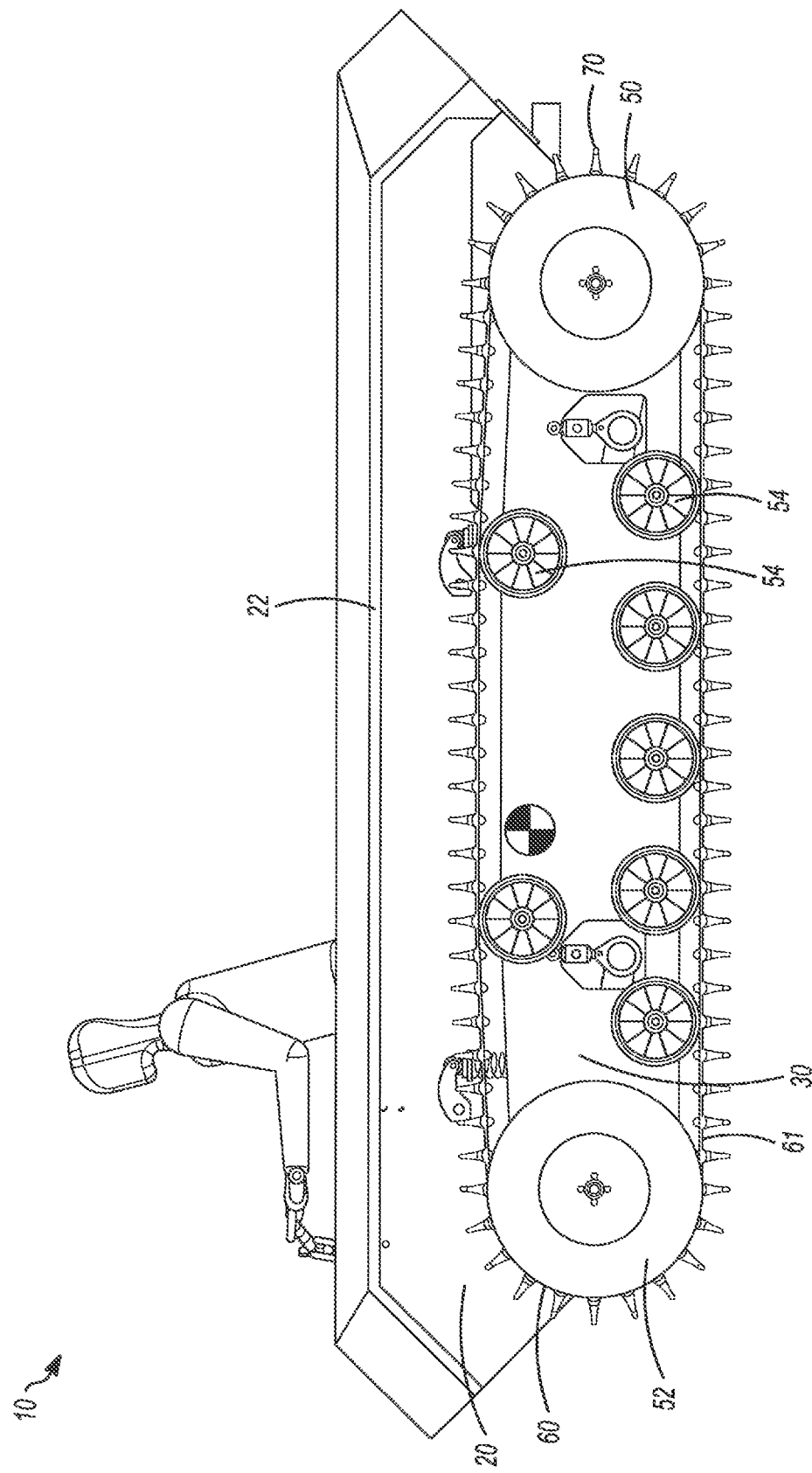
FIG. 1 is a side view of the tracked amphibious vehicle, according to one exemplary embodiment.
Figure 2:
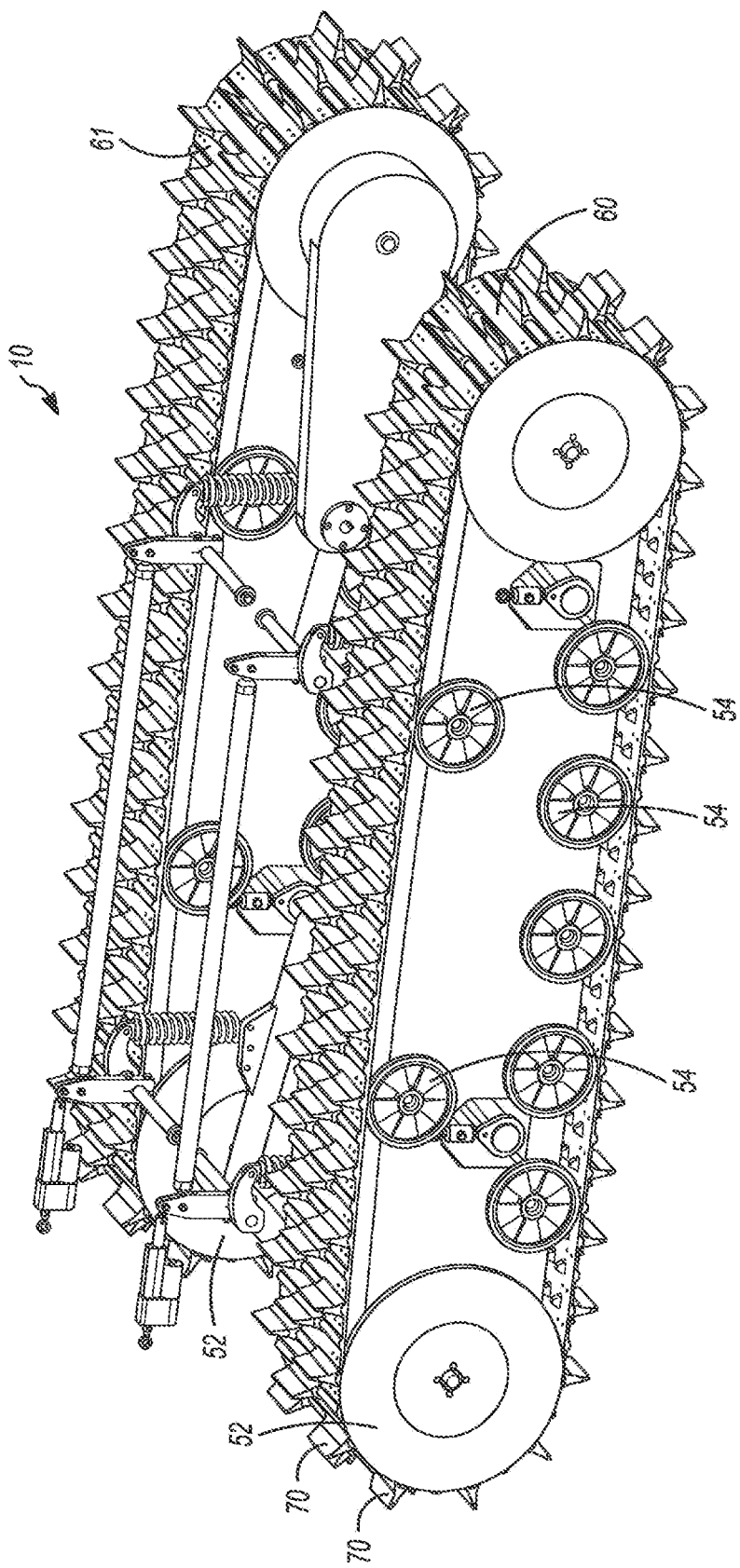
FIG. 2 is a perspective view of the vehicle of FIG. 1 depicting the vehicle with the hull removed, according to one exemplary embodiment.

Referring now to FIGS. 1 and 2, there is depicted a side view of a tracked amphibious vehicle 10 according to one exemplary embodiment. The vehicle 10 is comprised of a hull 20, which forms the main structure of the vehicle and wherein major components forming the vehicle 10 are attached. The hull 20 may be made of any metal such as aluminum, hand laid or molded composite materials, plastic or wood or a material known to a person of ordinary skill in the art. In exemplary embodiments, the material is Foam Core Carbon Fiber or Foam Core Kevlar™ (Aramid cord), although any material that will allow the hull 20 to have the desired characteristics is suitable. The hull includes a side fender 22. The hull 20 may be buoyant or non-buoyant. One preference is the hull 20 is buoyant. Attached to the hull 20 is a track frame 30 (in this depiction a track frame 30 is attached to either side of the hull 20). The track frame 30 may be made of any metal such as aluminum, hand laid or molded composite materials, plastic or wood or a material known to a person of ordinary skill in the art. An exemplary material is Foam Core Carbon Fiber or Foam Core Kevlar™ (Aramid cord), although any material that will allow the frame to exhibit the desired characteristics is suitable. Each track frame 30 may be buoyant or non-buoyant and may be of a rigid structure. Each track frame 30 may be attached to either side of the hull 20 by a suspension and drive system 1000 (See FIGS. 2 and 3). Each track frame further includes at least one rotatable drive wheel 40 (See FIG. 3A) and at least one rear idler wheel 50, in exemplary embodiments a pair of rear idler wheels 50 sandwiching said rotatable drive wheel 40, and at least one front idler wheel 52, in exemplary embodiments a pair of front idler wheels. The at least one rotatable drive wheel 40 may be made of Ultra High Molecular Weight (UHMW) plastic, nylon, Delrin and combinations thereof, although any material that will allow the at least one rotatable drive wheel to have the desired characteristics is suitable. The at least one idler wheel may be made of Ultra High Molecular Weight (UHMW) plastic, nylon, Delrin and combinations thereof, although any material that will allow the at least one rotatable idler wheel to have the desired characteristics is suitable. The at least one drive wheel 40 and at least one idler wheel 50 on each track frame 30 support a track 60. There is also depicted a plurality of centrally located idler wheels 54 to further assist with the securement of the track and reduce track slippage. The track 60 may be made of rubber, Aramid cord, material known to a person of ordinary skill in the art, and combinations thereof, although any material that will allow the track to have the desired characteristics will be suitable. In one example, the track may be made of a continuous loop Aramid cord reinforced rubber, a standard snowmobile track known to a person of ordinary skill in the art, or a plurality of segments hinged together to form a continuous track, each segment may be made of Ultra High Molecular Weight (UHMW) plastic, nylon, Delrin and combinations thereof. The track is in exemplary embodiments a rubber track, and is used for engaging the at least one drive wheel 40 and the at least one idler wheel 50. In this example there are two rear drive wheels (one per track) and a plurality of idler wheels. The at least one drive wheel 40 serves to drive the track in the direction of choice. The at least one idler wheel 50 assists in maintaining the track 60 on the frame 30. Idler wheels 50 and 52 are flanged at the edges thereof to contain each track on said respective track frame 30 and drive wheel 40 and reduce lateral movement of the drive wheel 40 and track 60. The track 60 on each track frame 30 provides grip and propulsion on land, and propulsion and lift on water. The track 60 may be formed as understood by people skilled in the art as well as be formed by a multi-link or segmented type track (See FIG. 11).

Referring now to FIG. 2, there is depicted a view of the vehicle 10, according to another exemplary embodiment, wherein the hull is removed, and an exposed view of the tracks 60, track frames 30, and idlers wheels 50 is provided. Each track 60 is comprised of a plurality of track lugs 70 on the outer surface of each track and inner drive lugs (or internal drive cogs) 80 on the inner surface of each track. The track lugs 70 and inner drive lugs 80 may be integral with the track 60 or may be detachable and replaceable. The track lugs 70 and inner drive lugs 80 may be made of high density plastic such as UHMW plastic, although any material that will allow the track and drive lugs to have the desired characteristics will be suitable. The track lugs 70 engage with the surface being travelled. The inner surface drive lugs 80 engage with the drive wheels 40 causing each track 60 to move in the desired direction and speed. For engagement of the drive lugs 80 with the drive wheels 40, drive wheels 40 have a plurality of drive lug receivers 42 thereon (See FIG. 3A). Drive lug receivers 42 are shaped to receive the drive lugs 80 to drive the track in the desired direction and guide the track as desired, and minimize any slippage of the track 60 on the drive wheels 40.

Figure 3A:
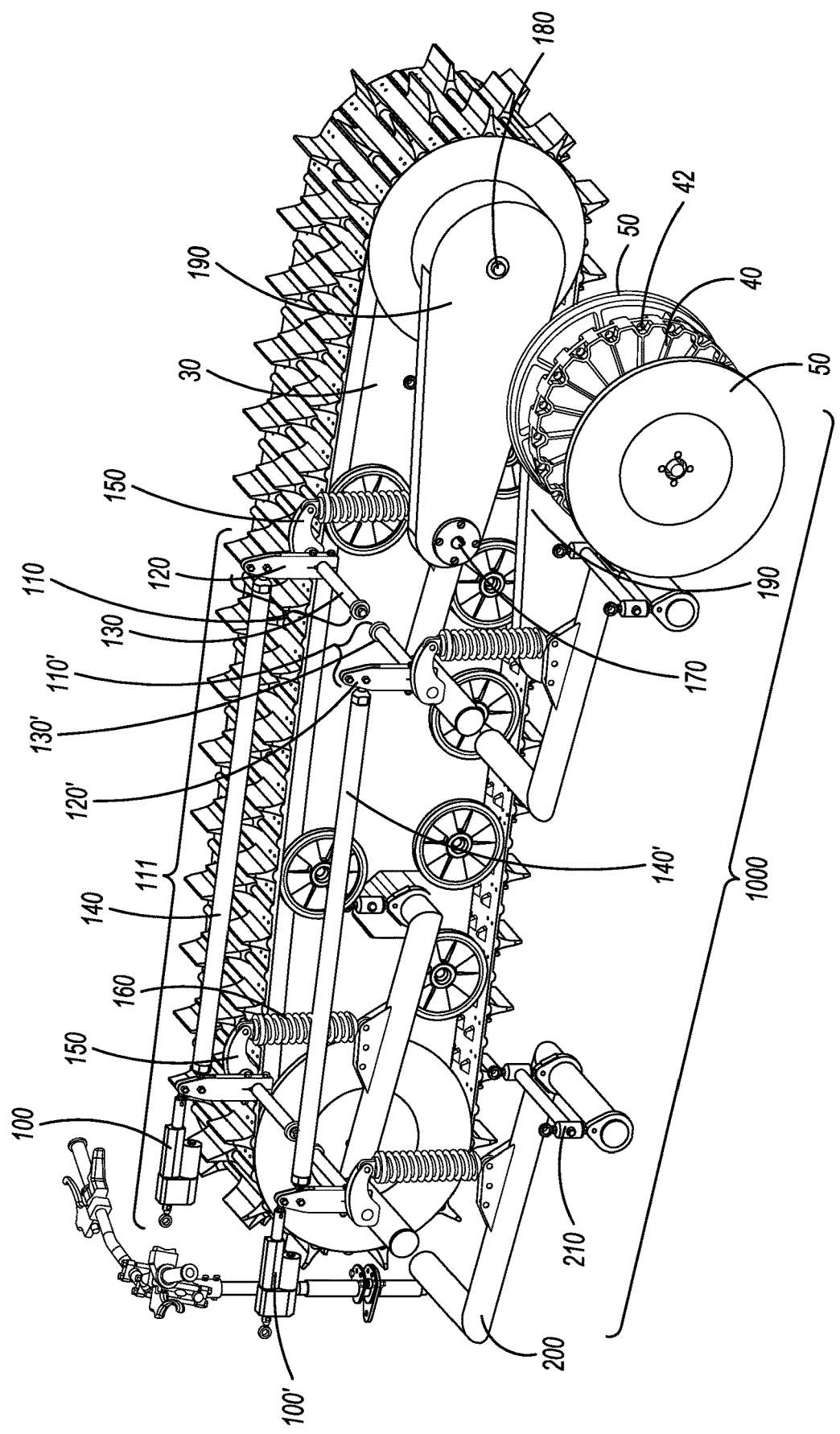
FIG. 3A is a perspective view of the vehicle of FIG. 1 depicting the steering and suspension system, with one side track and track frame removed, according to one exemplary embodiment.
Figure 3B:
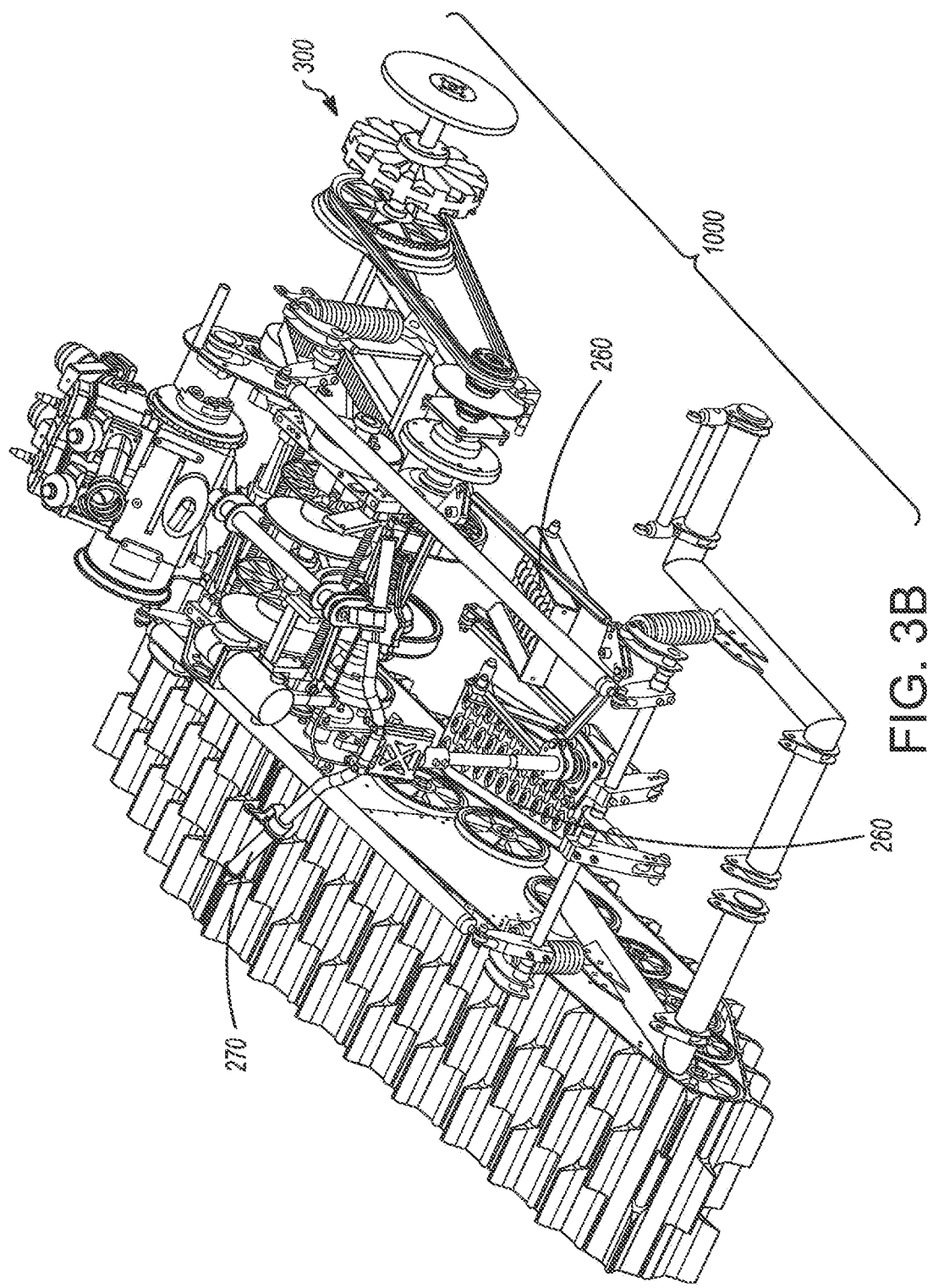
FIG. 3B is a perspective view of the vehicle with foot pedals adjusting tilt.
Figure 3C:
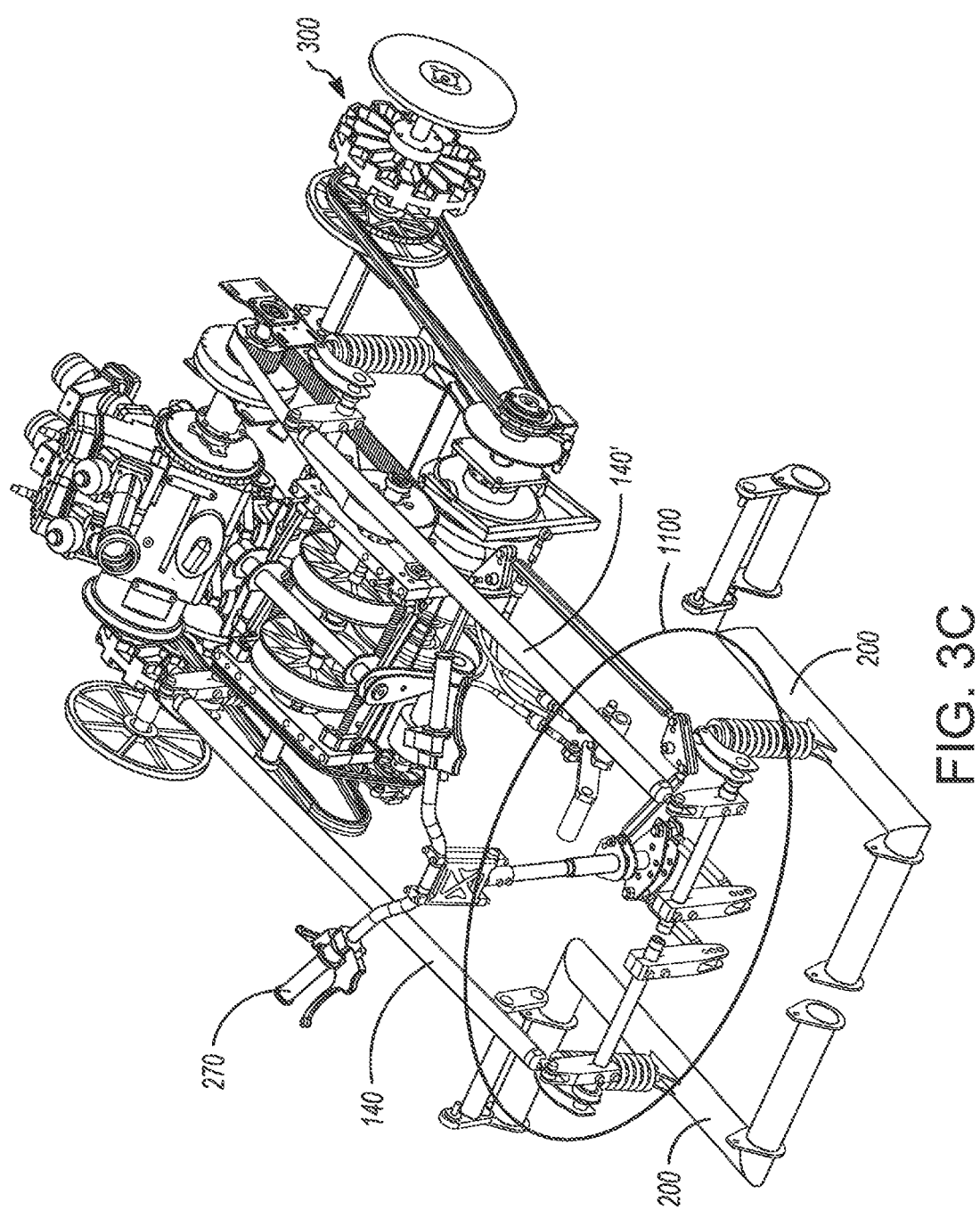
FIG. 3C is a perspective view of the vehicle with handle bars adjusting tilt.

Referring to FIGS. 3A, 3B and 3C, a suspension tilt system is shown. In FIG. 3A, the tilt system for tilt adjustment system) 111 comprises, as an exemplary embodiment, two linear actuators 100, 100'. Linear actuators 100, 100' provide positioning of the tilt bell crank assemblies 110, 110' each comprising a tilt pivot arm 120, 120' and tilt axle 130, 130'. The linear actuators 100, 100' actuate the tilt bell crank assemblies 110, 110' via tilt connectors arms 140, 140' connecting the linear actuators to their respective tilt bell crank assemblies 110, 110' such that when the vehicle suspension of the left and right side are travelling in unison, vehicle height may be adjusted when the bell crank assemblies rotate, whereas when one side is moving in the opposite direction of the other side (i.e. one side is moving upwards while the other side is moving downwards), the vehicle tilts. Each tilt connector arm 140, 140' transfers force from the front tilt bell crank assembly to the rear tilt bell crank assembly as well as connects each side of the front and rear pivotal shock mounts 150 allowing movement (such as linear movement) of the pivotal shock mounts 150 to be in unison while keeping the front and rear pivotal shock mounts 150 parallel to each other. Tilt axle 130, 130' serves several purposes including pivotally attaching shock mount 150 to the hull 20; carrying vertical load applied to the track frame 30; transferring torque between shock mount 150 and tilt pivot arm 120, 120' and supplementing the structural strength of the hull 20. Tilt pivot arms 120, 120' receive torque from each respective tilt axle 130, 130' and apply force to the respective tilt connector arm 140, 140'. Each coil-over shock (biasing means) 160 is comprised of a coil spring surrounding a hydraulically dampened shock, although any biasing means may be applied herein. The tilt bell crank assemblies 110, 110' connect the track frames 30 to hull 20 by coil-over shocks 160. Each jackshaft 170 receives torque from a variable ratio differential and transfers torque to each rear drive axle 180 that drives the drive wheel 40, in exemplary embodiments via a gear belt (or timing belt). In this embodiment, each side of the vehicle 10 includes a jackshaft 170, positioned concentric to each other whilst allowing for independent rotation from each other. Each jackshaft 170 serves to transfer acceleration and deceleration forces (push/pull) from the rear driver axle 180 to the hull 20 through each enclosed swing arm 190. The vertical component to the force in response to torque creates a force vector responsible for suspension behavior of the vehicle 10 during speed rate of change. Each enclosed swing arm 190 is comprised of a hollow housing (which may be waterproof) containing a rotatable mounted drive and driven gear belt pulley. Drive wheel 40 receives torque from the rear drive axle 180 applying force (which may be a linear force) to the drive lugs 80; transfers radial loads from the ground into the rear drive axle 180 (supported by the track frames 30); guides tracks 60 positioned between track drive lugs 80 and transfers lateral forces received from the tracks 60 into the rear drive axle 180 producing an axial load on the rear drive axle 180 which is transferred into the track frames 30 and then transferred to the S-arms 200, which in turn apply lateral force to the hull 20. Each rear drive axle 180 rotatably mounted inside the enclosed swing arm 190, receives torque from the driven gear belt pulley of the enclosed swing arm 190 and applies torque to the track driver (drive wheel) 40. The rear drive axle 180 further handles axial and radial loads generated by interactions between the ground and the hull 20, and is mounted to each respective track frame 30 with bearings. Rear idler wheels 50 control track tension and shape while transferring radial loads from the ground into the rear drive axles 180 and transfer compression loads from tracks 60 into the rear drive axles 180. S-arms 200 include front S-arms and rear S-arms. One end may be pivotally connected to the hull 20 and the other end may be pivotally connected to a respective S-arm linkage 210. The S-arms serve to reduce lateral forces, permit vertical suspension travel with no influence on acceleration or braking forces. Each S-arm linkage 210 is pivotally connected to the track frame 30 and reduces lateral forces.

In FIG. 3B, two foot pedals 260 are shown with the left pedal up and the right pedal down. This version does not have the linear actuators of FIG. 3A. The actuation of foot pedals 260 actuate the torque arms to rotate, which in turn facilitate adjustment of the suspension height with bell crank shock mount pulled up to lower the suspension and bell crank shock mount pushed down to raise the suspension (i.e. tilt steering the vehicle). The handle bar 270 further facilitates the directional control of the vehicle. This is a full manual version.

In FIG. 3C, the vehicle includes handle bar 270 to actuate tilting of the vehicle and steering of the vehicle (no foot pedals and no linear actuators). In this case, when an operator turns the handle bar 270, the vehicle is tilted through suspension height adjustment and steered through controlling the differential steering system. In this case the steering column tilt pivot arm is welded to the steering column. This is a full manual version.

Figure 4:
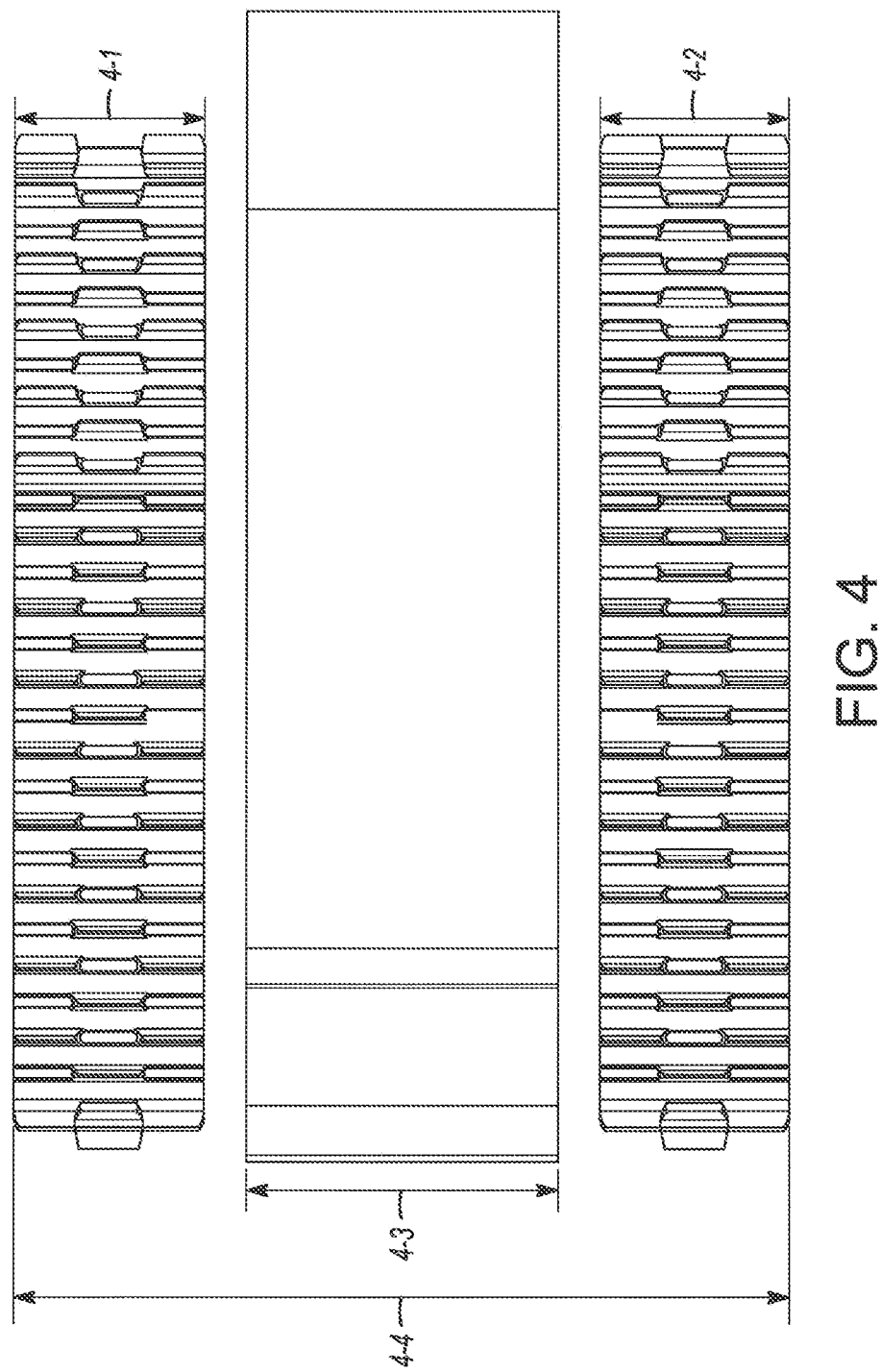
FIG. 4 is a bottom view of the vehicle according to an exemplary embodiment.

Referring now to FIG. 4, there is depicted the bottom of the vehicle according to an exemplary embodiment wherein the total track width TTW is the sum of the width of a first track (T1) and a second track (T2). There is also depicted the hull width (HW) and the overall width OW of the vehicle bottom being the width from one side of the vehicle to the other side of the vehicle. This also allows one to calculate a total track width to overall width ratio. In this instance, the total track width to overall width ratio is from about 0.40:1 to about 0.95:1.

FIG. 4 also depicts the bottom of the vehicle according to an exemplary embodiment where the lift producing area is measured and wherein the ratio of lift producing track width TTW of 32 inches to lift producing hull width HW of 26 inches is about 1.23:1.

Figure 5:
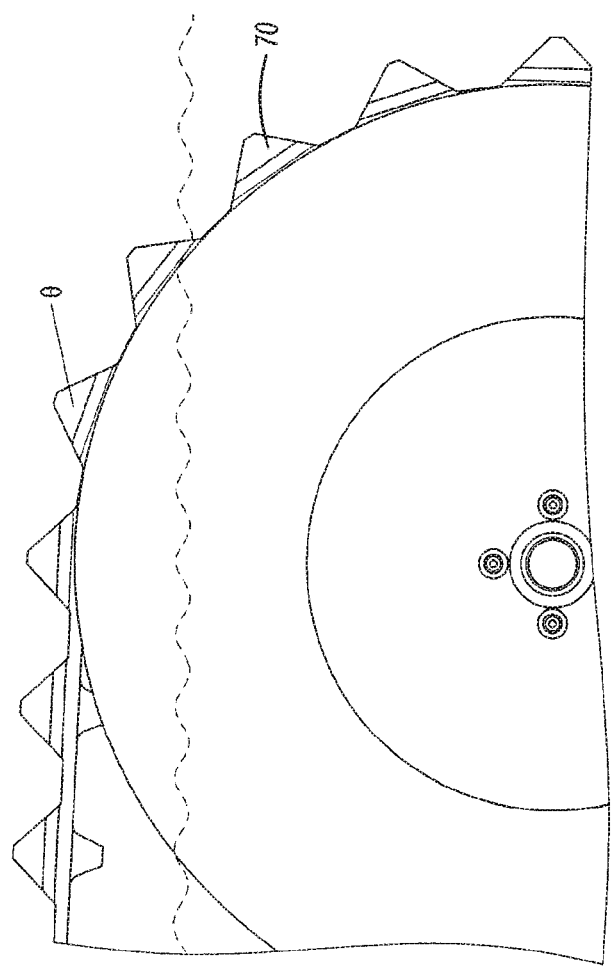
FIG. 5 is a perspective view of the track lugs, according to an exemplary embodiment.

Referring now to FIG. 5, there is depicted an exemplary profile of the track lugs 70. In this example, each track lug has a triangle like profile resembling an isosceles triangle with a truncated top. The angle θ can range from about 30 degrees to about 120 degrees. This profile is advantageously effective during land as well as water travel.

Figure 6:
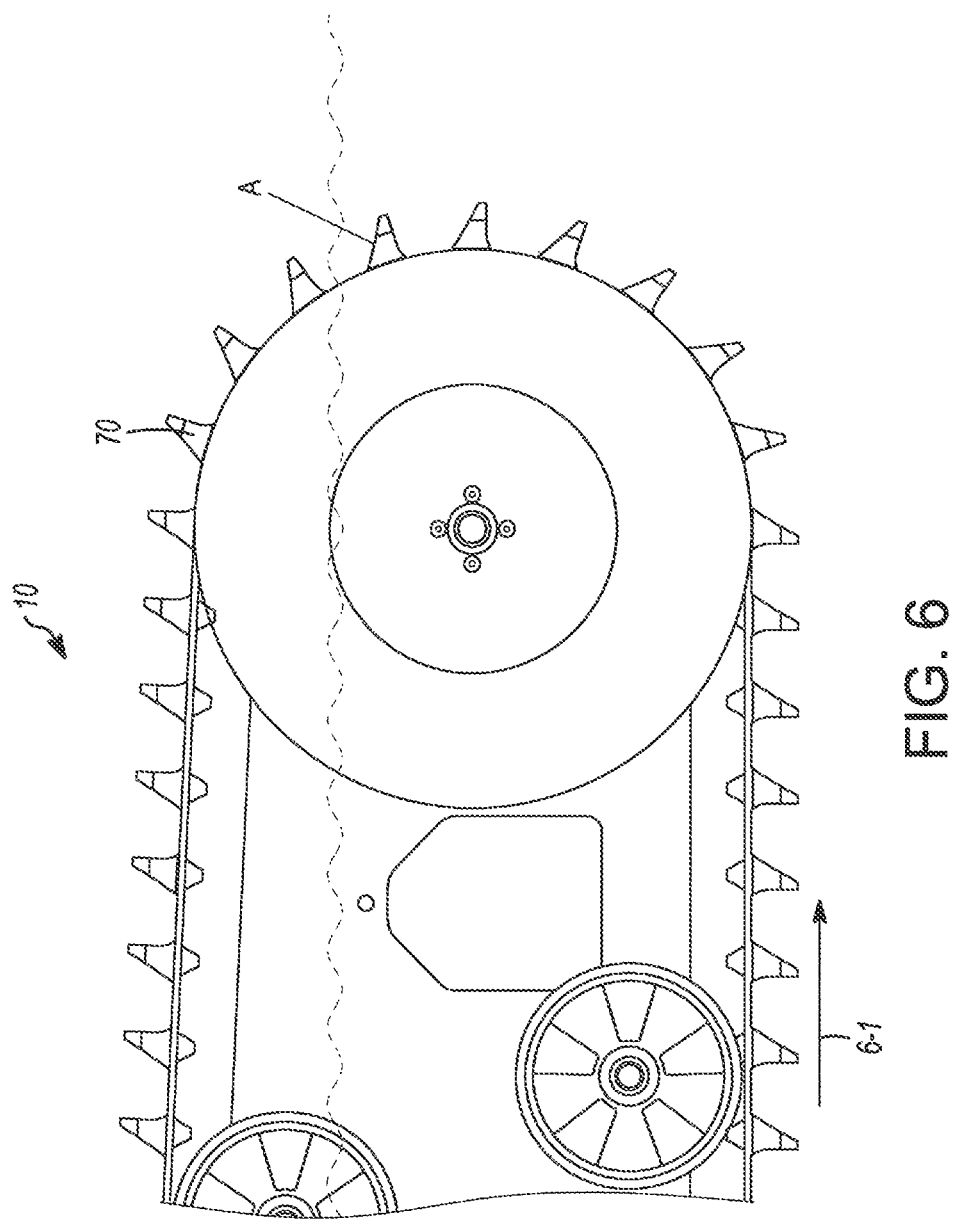
FIG. 6 is a perspective view of the track lugs, according to yet another exemplary embodiment.

Referring now to FIG. 6, there is depicted another exemplary profile of the track lugs 70. In this example, the track lug has a triangle like profile resembling a right-angle triangle wherein the angle opposite the track surface is about 45 degrees and one side forming the 90-degree angle is facing opposite the direction of travel. In this case, side A of the lug will tend to direct water, in contact with the lugs when coming up from the water surface, away from the vehicle when moving and thus facilitate the movement of the vehicle 10 in water.

Although two profiles have been provided as examples, other triangle like profiles may also be used. In general, according to one exemplary embodiment, each track lug 70 has a chamfered outside edge proximate the top thereof to facilitate travel along surfaces and in particular when the vehicle is turning by reducing said vehicle from gripping on said surface and resulting turning of same.

Figure 7:
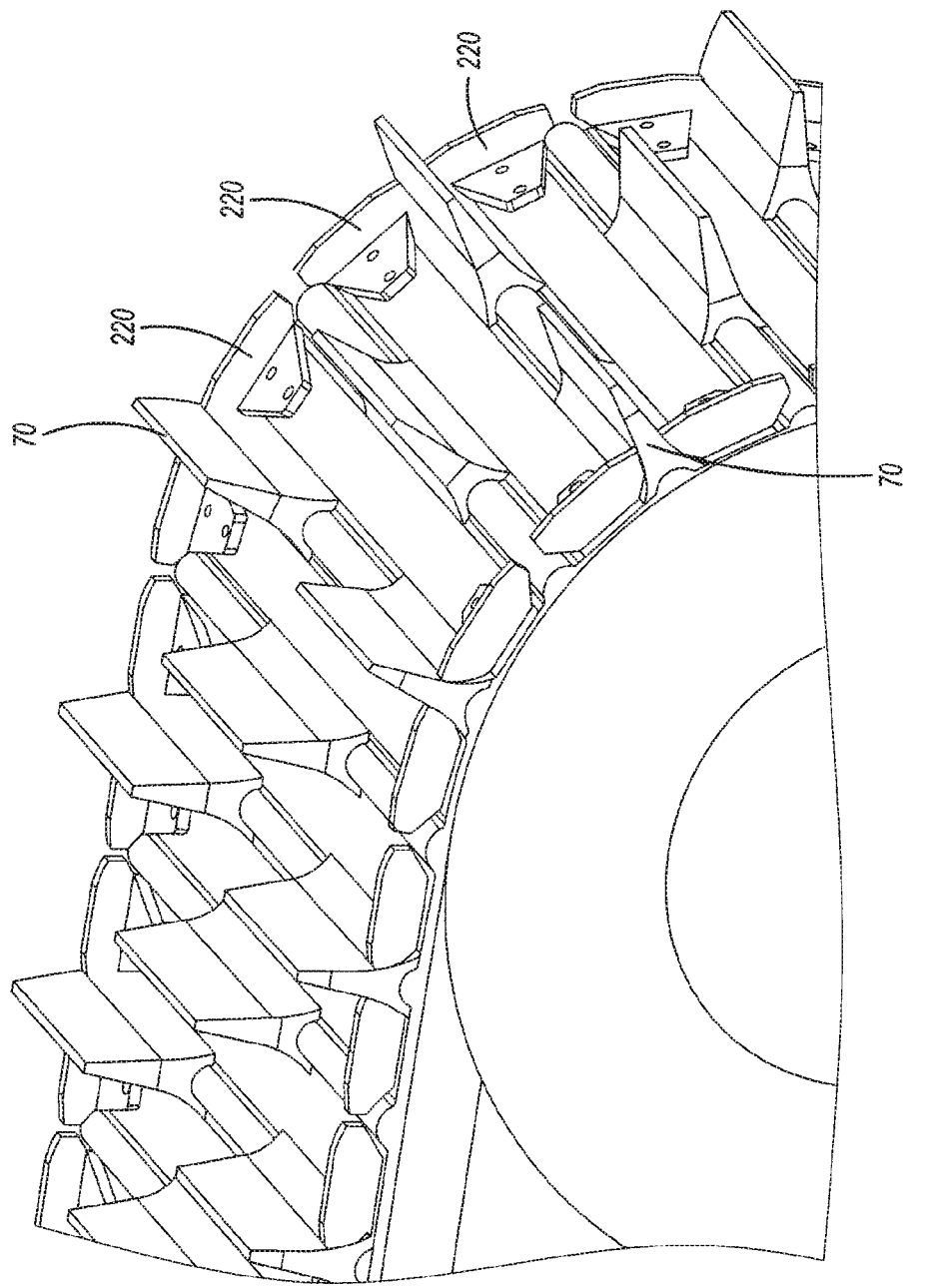
FIG. 7 is a perspective view of the side track flanges, according to an exemplary embodiment.

Referring now to FIG. 7, there is depicted side flanges 220 running along the sides of the tracks. Side flanges 220 may be an integral part of the track or they may be attached by rivets and detachable as depicted in FIG. 7. Side flanges 220 extend outwardly normal from the outer surface of the track forming an inner side wall and an outer side wall extending up towards the top of the track lugs 70. Said side flanges 220 assist in reducing water that is captured between track lugs 70 from flowing outwards along the sides of the tracks when travelling on water. This action assists in the lift of the vehicle along the water. Once the tracks begin to form a wake out the sides of the tracks and most of the water has cleared from inside the tracks, side flanges 220 advantageously increase lift of the vehicle by containing water within the tracks. This containment increases lift and reduces drag resulting in more speed of the vehicle on water.

Figure 8A:
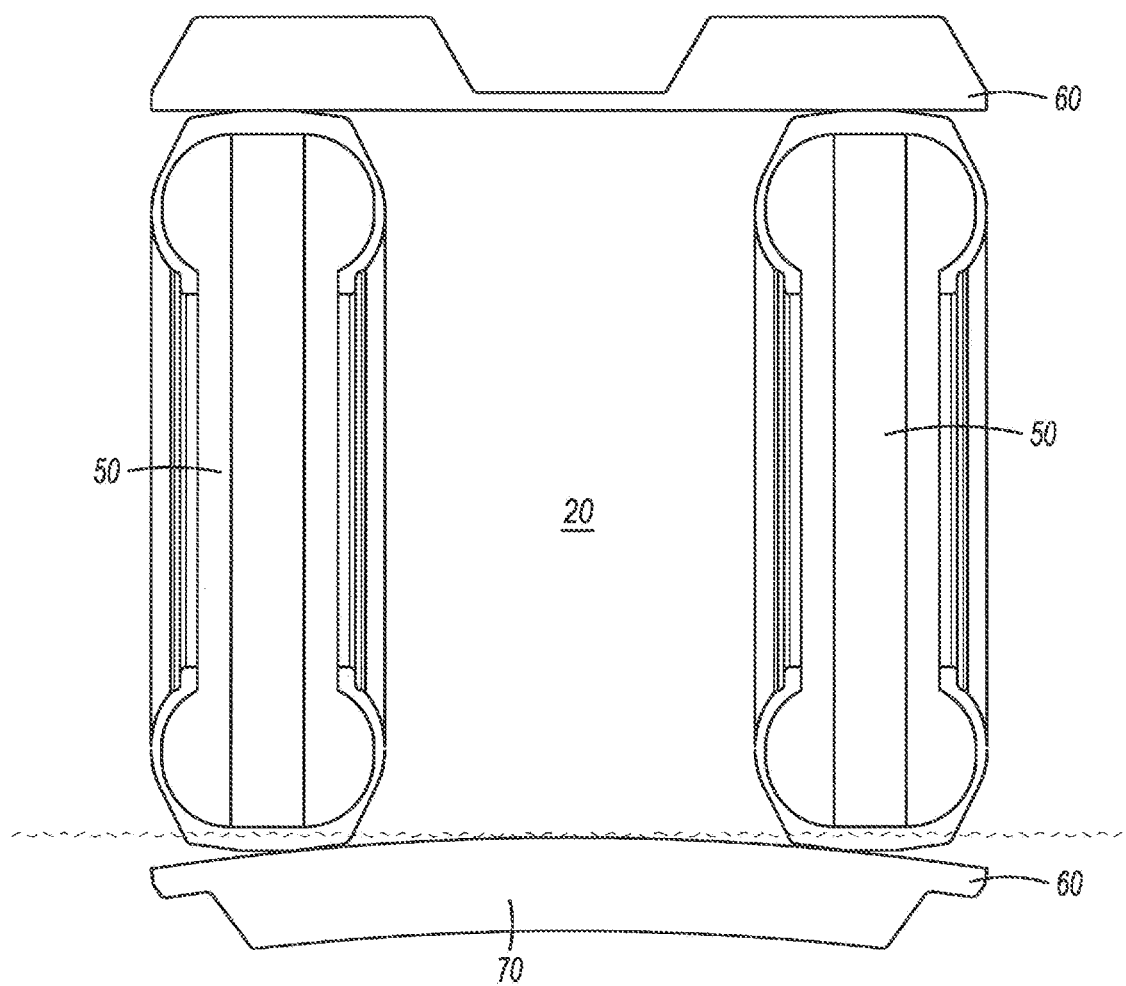
FIG. 8A is a cross sectional view of the track when concaving in an exemplary embodiment.
Figure 8B:
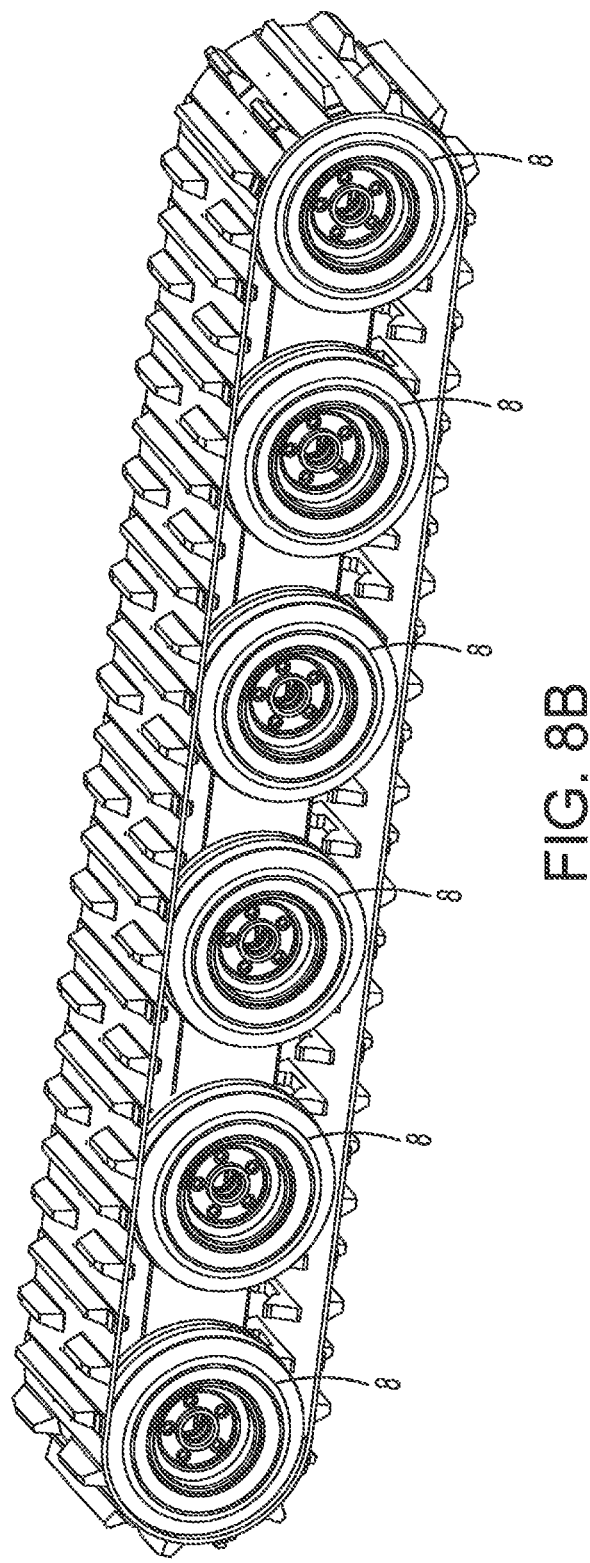
FIG. 8B is a perspective view of an alternative of the track and wheel configuration.

Referring now to FIG. 8, the side flanges 220 may be "S" or serpentine shape and are deformable without tearing. Other shapes include zigzag (not shown). The side flanges 220 may be called side treads as well. The deformable aspect of the side flanges allows for the side flanges 220 to stretch and straighten out while the track follows the radius of idler wheel without tearing when the track is bent in an arc such as when travelling over the outer diameter of the idler wheel. FIG. 8A depicts an alternative wherein track 60 is resilient such that at planing on water, the central longitudinal portion of the track running along the water forms a concave area between the water, the drive 50 and/or idler wheels and the track 60, resulting in water being trapped along the underside of the vehicle resulting in further lift while planing. The drive wheels 50 and/or idler wheels are positioned, preferably proximate the outside edges of said track, such that concaving of the track is urged while the vehicle is planing on water. In this alternative, lug 70 flexes to form a concave area between the water and the track 60 and returns to an unflexed form when not in contact with the water. In a further alternative, as per FIG. 8B, there are a pair of at least two or more spaced apart tires (or other cylindrical object such as a rigid plastic wheel or metal wheel) wherein one pair is proximate one end of the vehicle and the second pair is proximate a second end of the vehicle, with at least one track mounted thereon such that water force on the track while said vehicle is water planing creates an arc (or deflects the underside of the track creating a concave shaped underside track in relation to the water) along the underside of the track (SEE FIG. 8A).

Figure 9A:
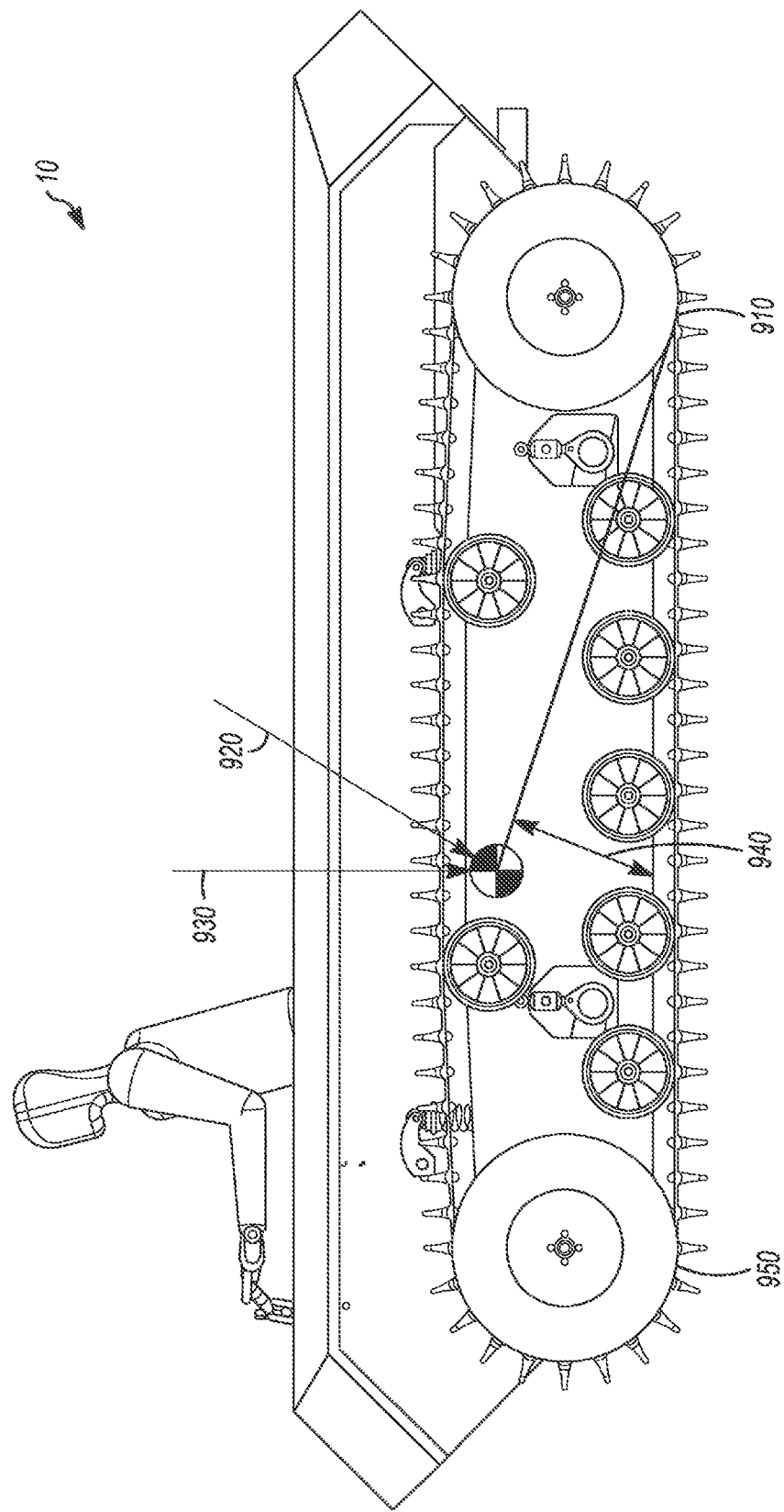
FIG. 9A depicts the angle formed from the center of mass and a trailing edge and the bottom of the track, according to an exemplary embodiment.

Referring now to FIG. 9A there is depicted another exemplary embodiment of the vehicle 10, with a fixed suspension, wherein the center of mass and a trailing edge 910 and the bottom of the track form an angle of from about 35 degrees or less. In another exemplary embodiment, the angle is from about 35 degrees to about −20 degrees. When the suspension and the trailing edge is below the center of mass of the vehicle, the angle is positive. When the suspension and the trailing edge is above the centre of mass of the vehicle, the angle is negative. In FIG. 9A, the angle is 18 degrees.

Figure 9B:
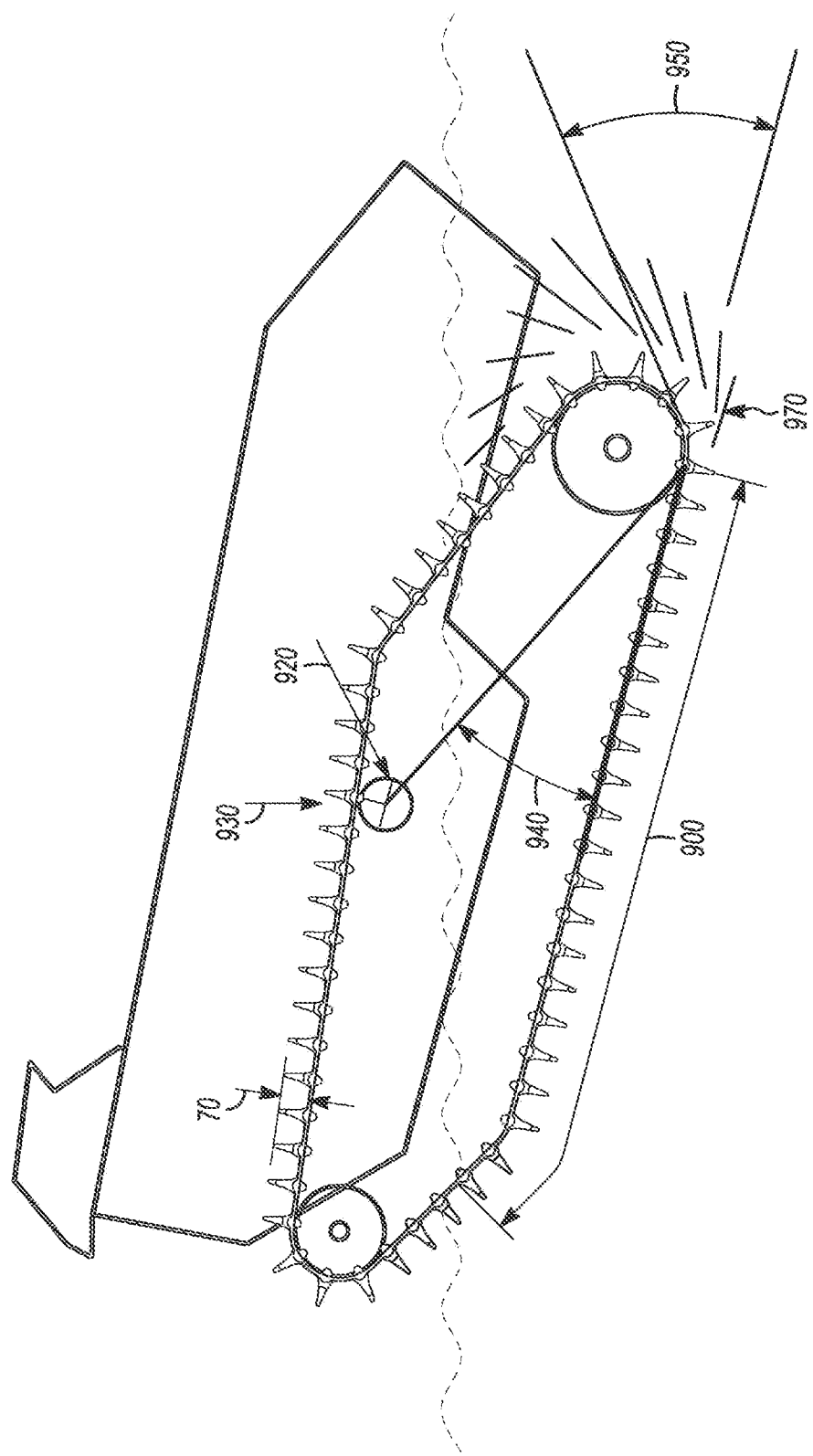
FIG. 9B depicts the angle formed from the center of mass and a trailing edge and the bottom of the track, according to an exemplary embodiment at the water planing threshold.

Referring now to FIG. 9B, there is depicted the vehicle in another exemplary embodiment wherein the vehicle is in water at the planing threshold showing the wetted track surface 900 producing lift. The angle as described above is at 25 degrees. Furthermore, the clearance for water leaving from said track is at least 40 degrees from the rear end of the hull. This minimizes the drag on the vehicle and facilitating planing of said vehicle on water.

Figure 10A:
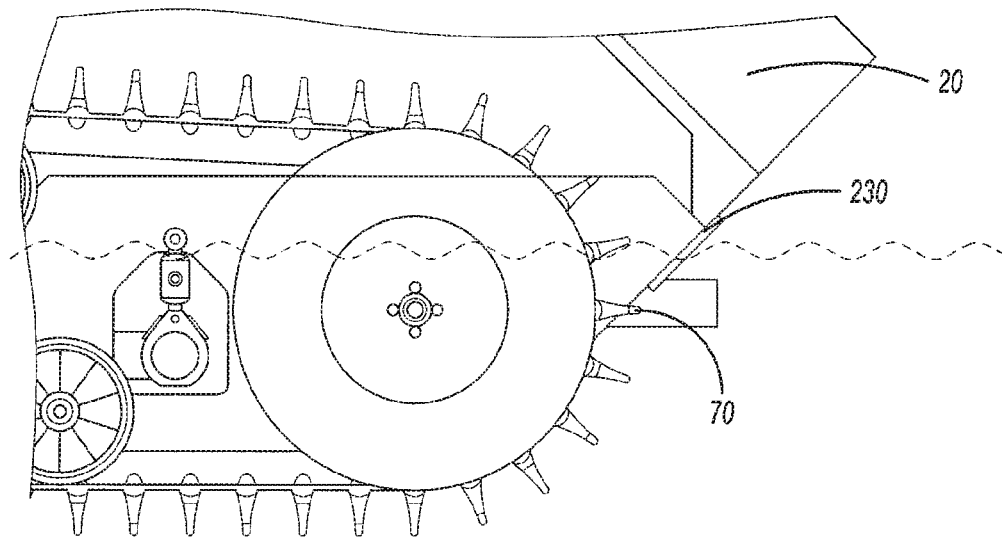
FIGS. 10A and 10B depict the water diverter, according to an exemplary embodiment.
Figure 10B:
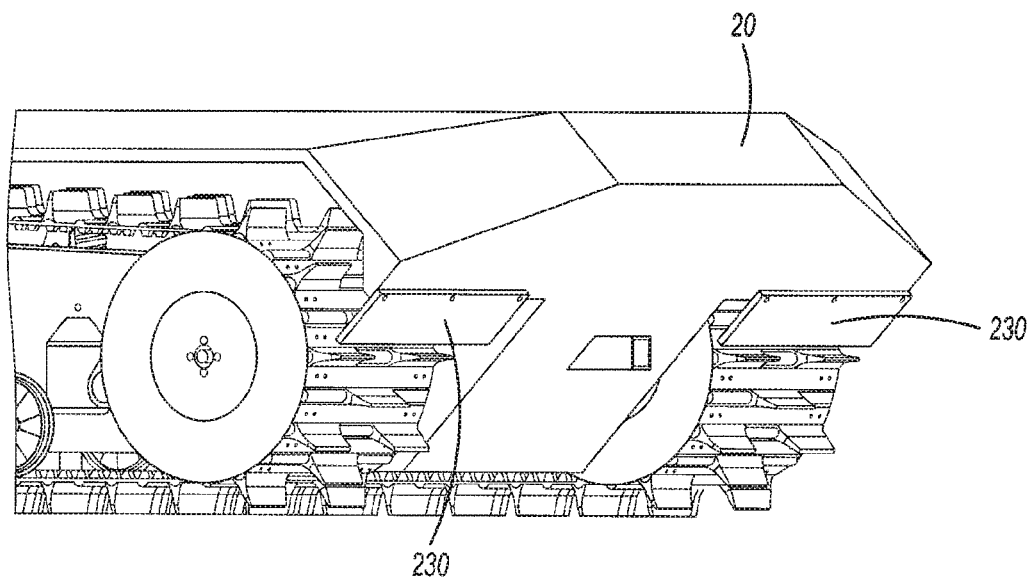

Referring now to FIGS. 10A and 10B, there is depicted a water diverter (or fender) 230 proximate the rear of the vehicle 10 (although the water diverter may also be proximate the front of the vehicle for reverse travel). The water diverter 230 reduces water along the rear of the track from returning back along the top of the track and towards the front of the vehicle 10 as well as splashing up against the vehicle when the diverter 230 is about at or below the water line. The water diverter 230 in this exemplary embodiment is a rubber flap square in shape and attached to the rear of the hull 20 with the leading edge of the water diverter 230 being proximate the top of track lugs 70 but not touching the track lugs 70. Another exemplary embodiment (not shown) the leading edge of the water diverter 230 touches the track lugs 70 without negatively affecting the movement of the tracks or speed of the vehicle. The diverter may be part of the chassis structure, bolted to the chassis, be part of the fender, be solid, hollow, made of any material or mounted to a rear trailer hitch as long as it minimizes and in exemplary embodiments blocks surface water flow from feeding into the returning top side of the track. A vertical plate behind the track extending from above to below the water line will increase track propulsion efficiency more effectively than all other devices that divert water spray. Many variations of a fender design are possible, in this example the lead edge of the fender extends below the water surface while vehicle is at rest in the water and the trailing edge of this fender extends above the water line at an angle between 0 and 90 degrees while in exemplary embodiments at 30 degrees to bottom of track. Many variations to the lead edge material and shape are possible but a sturdy rubber belt material is preferred to absorb the abuse of mud, rocks and ice while running close or in contact with the tracks.

Figure 11:
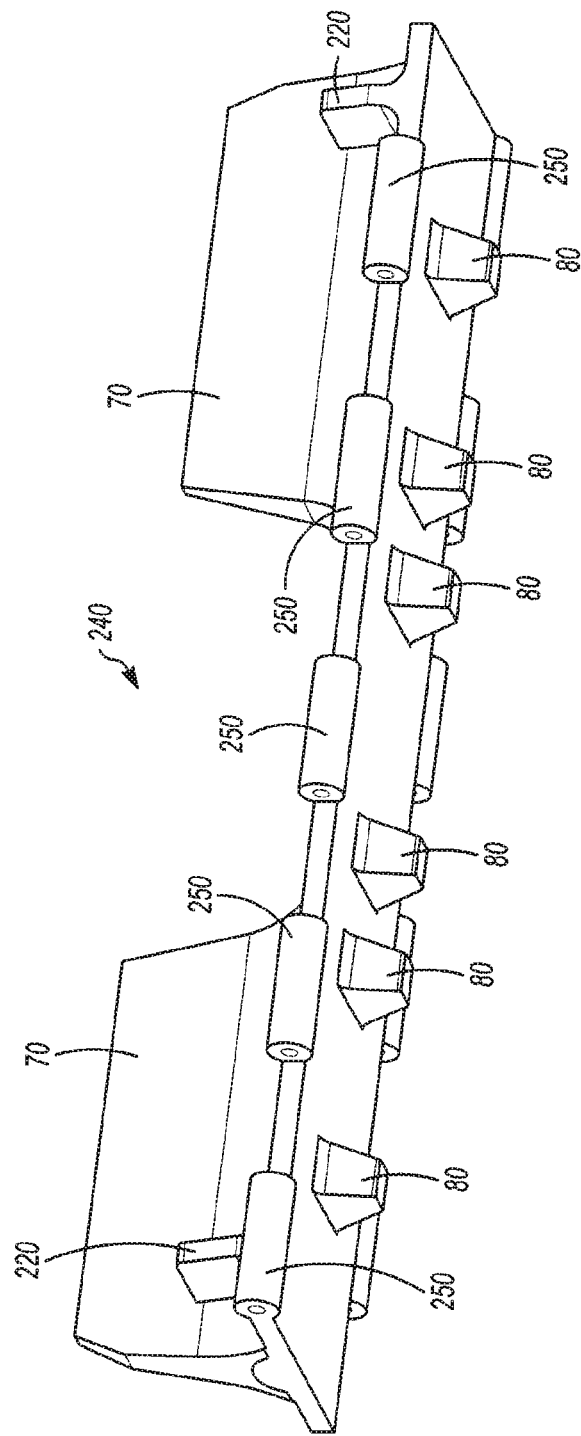
FIG. 11 is a perspective view of a linkable segment forming the tracks, according to an exemplary embodiment.

Referring now to FIG. 11 there is depicted a linkable track segment 240 which, along with other linkable track segments, when connected to each other, forms a segmented track. Each linkable segment 240, in this embodiment, consists of track lugs 70, side flanges 220 and drive lugs 80. Each linkable segment is connectable to another linkable segment allowing for rotation with each other via connectors 250 running along either edge of the segment 240. The connectors 250 are spaced apart from each other allowing the connector of an adjoining linkable segment to be received in the spaces between the connectors of the first segment. The linkable segments may be connected to each other via a connecting rod (not shown) running through the connectors 250 joining the linkable segments and allowing the adjacent linkable segment to be rotatable in relation to the other to form a continuous rotatable track to be used with said vehicle 10. One advantage of a linkable segmented track is the facilitation of removal and replacement of a portion of the track as needed through removal and replacement of at least one linkable segment. Another advantage of the linkable segmented track is a wide variety of material choice other than, for example rubber of the like. In particular, for example, the material of the linkable segment may be a rigid non-deformable material which when linked together to form a track, results in a track that exhibits at least one desired characteristic of a rubber track. A third advantage is the selection of material to form a track that may accommodate heavy vehicles and/or vehicles with heavy loads without compromising desired characteristics of a continuous track (e.g. structural integrity).

Referring now to FIGS. 12-1 and 12-2, there is shown a side by side comparison of path trajectory of an amphibious vehicle with a continuously variable ratio steering differential (VRD) (continuously variable speed transmission and steering differential) versus a vehicle with brake steering (skid steering). As can be clearly seen, the VRD vehicle 10 provides for a smooth travel trajectory and better steering control versus a brake steer system which provides for a rough travel trajectory and inherent shortcomings such as loss in power while steering (due to braking requirement). The VRD vehicle provides for no loss of power during steering while both tracks drive the differential speed ratio while steering. Brake steering puts a tremendous load on the drive system to steer.

One example of typical overloading when using a brake steering system follows: A vehicle (100 hp utility task vehicle (UTV) engine equipped with a single belt conventional continuous variable transmission (CVT) travelling at full speed has a lot of momentum and the engine is cranking out the maximum 100 hp. When the user brakes to steer, the initial load on the drive system is much more than the capacity of the 100 hp engine which may result in a shock load if performed rapidly (resulting in belt slippage which in turn generates heat through belt slippage reducing efficiency) and result in failure of the single belt.

Figure 12A:
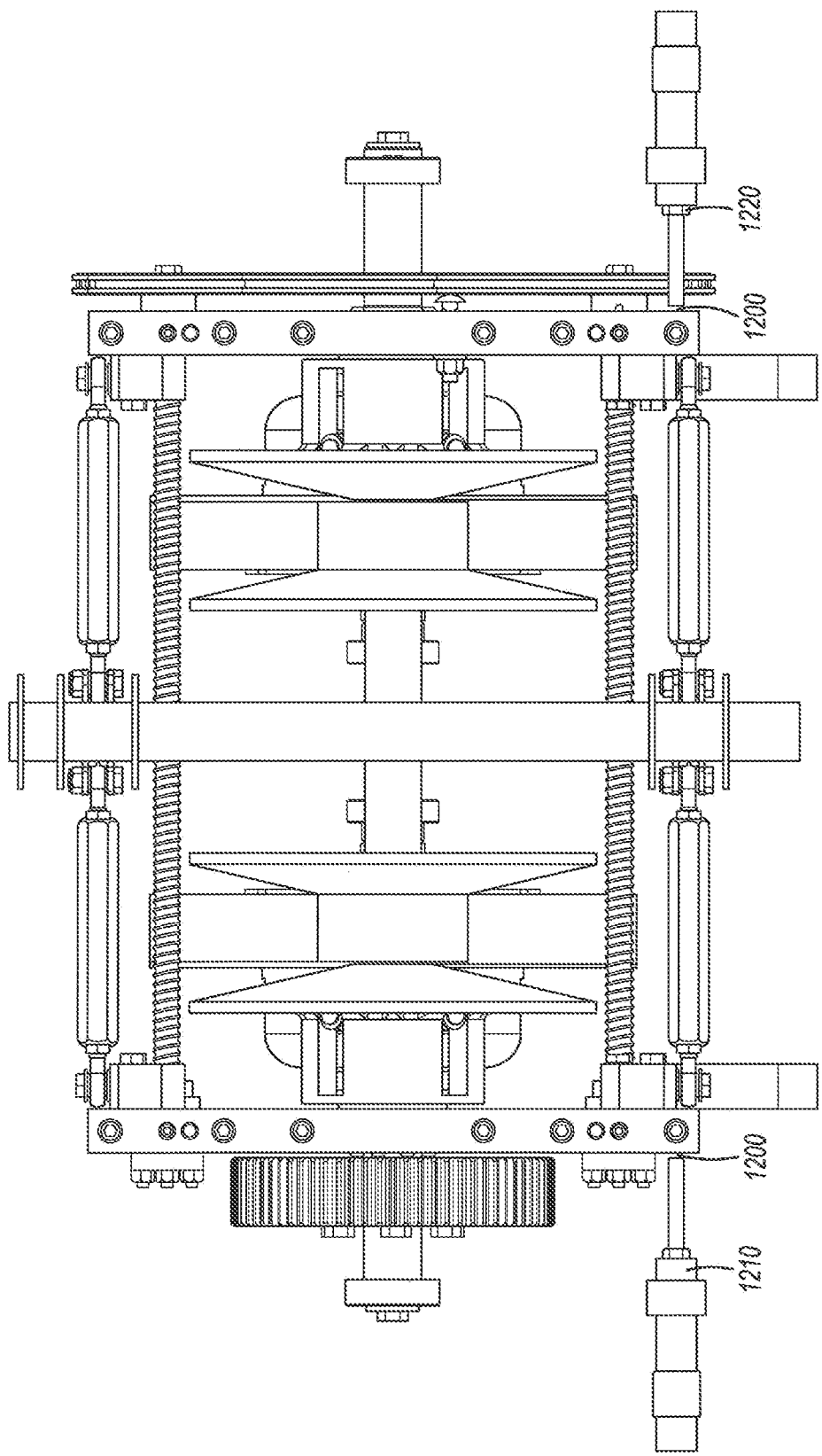
FIGS. 12A-12C depict turning actions of the continuous variable speed transmission and differential according to an exemplary embodiment.
Figure 12B:
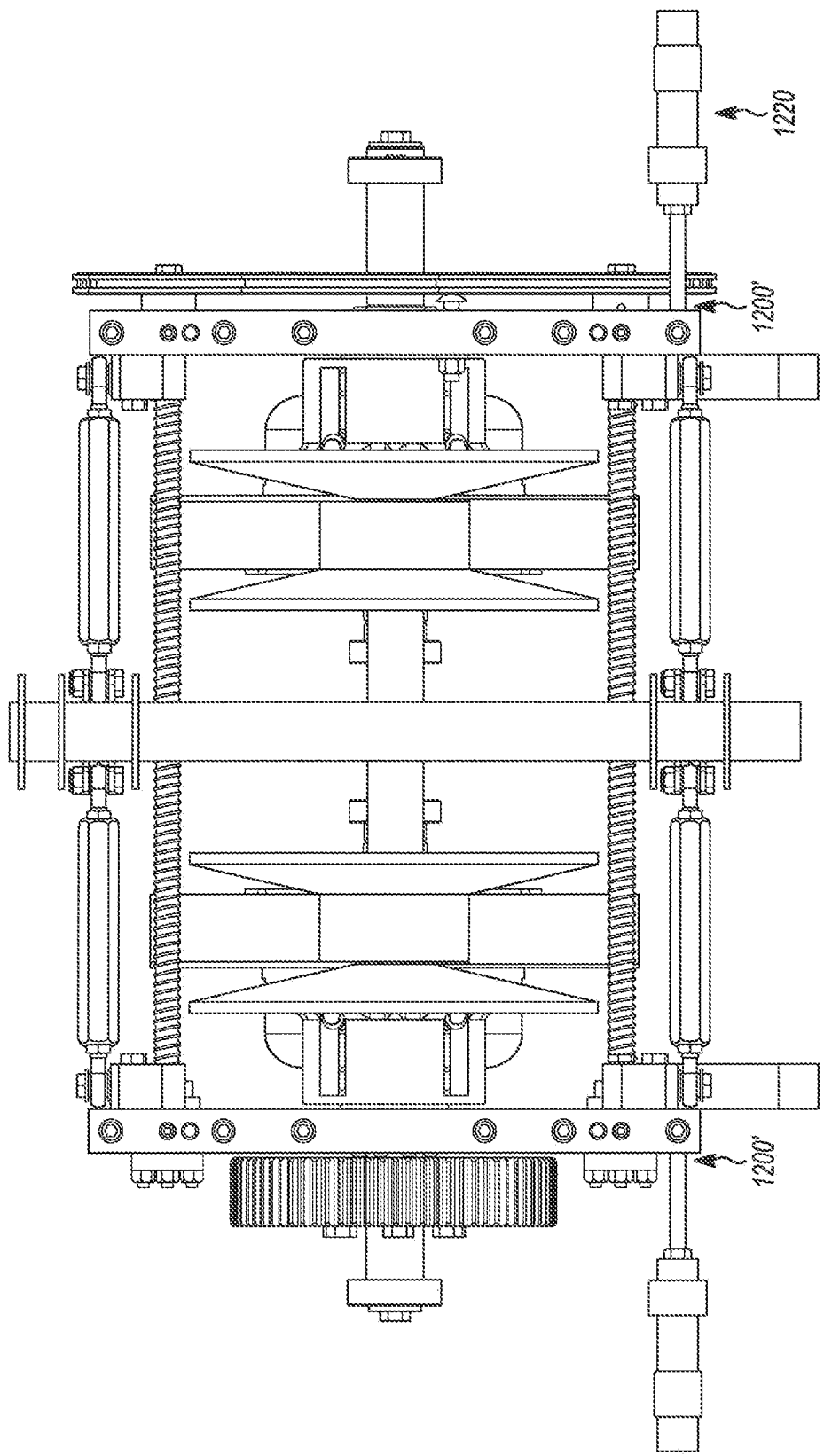
Figure 12C:
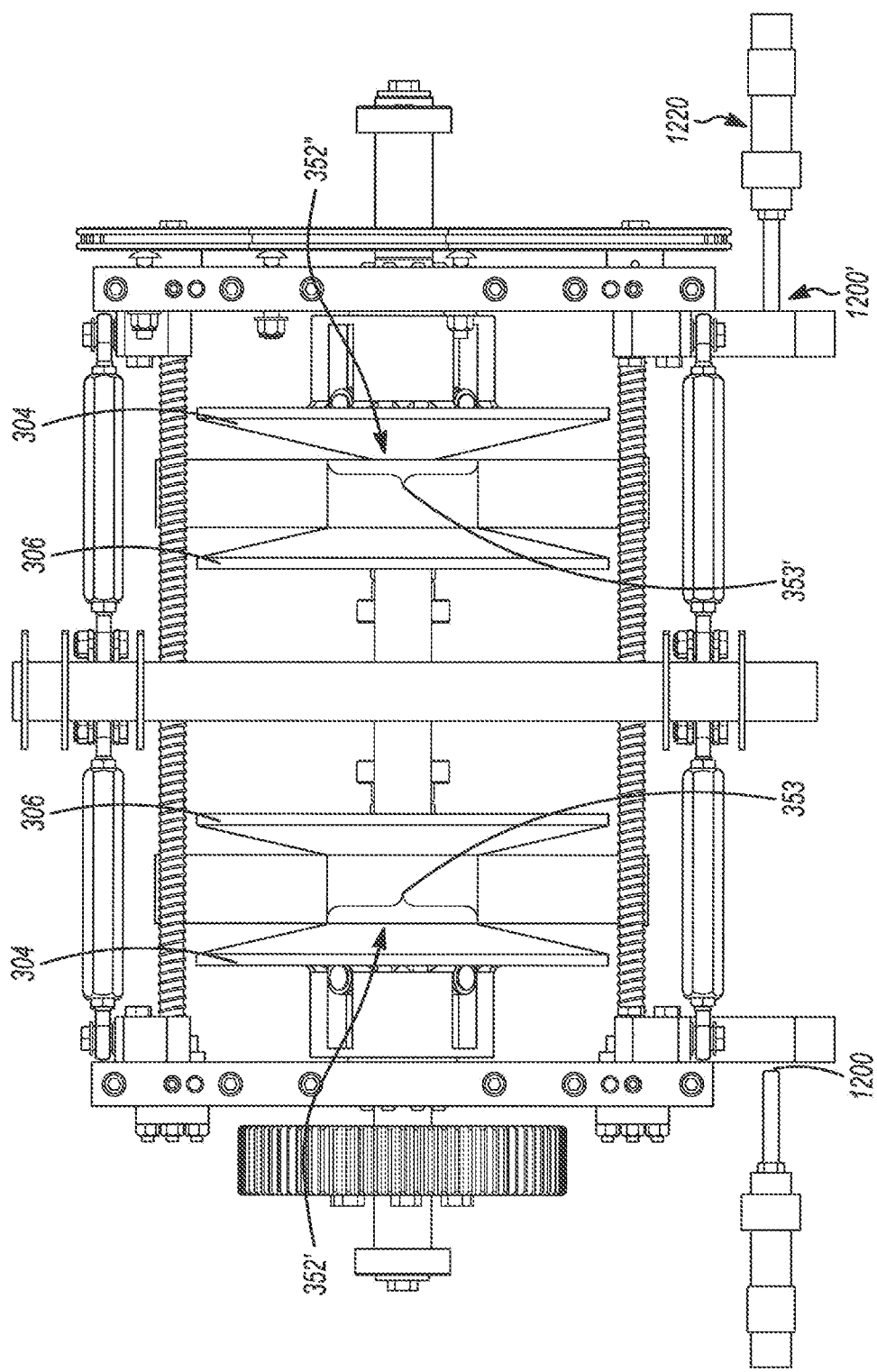

Steering the amphibious vehicle, of the present disclosure with a VRD, at full speed is unlikely to be overloaded like the prior art system described above given both tracks of the vehicle are continuously driven. The VRD allows the vehicle to attain high speeds for an extended period of time and experience steering for an extended period of time with minimal or no change in temperature of any drive components of the VRD. During steering at high speeds, there would be minimal to no speed loss (any speed loss would come from the increased rolling resistance from the tracks slipping sideways). The VRD is not impacted by trajectory (straight or turning path). The VRD further has a self-centering capability urging both track speeds to be equal and thus maintain a straight path when the steering system is not urged one way or another. In typical brake steer systems, the braking side does not disengage the transmission but rather locks the planetary gear or the like, which doubles the output RPM of the non-braking side. However, the doubling of the RPM of the non-braking side reduces the torque, typically by a factor of about 2, thus reducing the overall driving force of the vehicle while turning, as well as increasing the load on the engine. On the contrary, the current system (VRD system) disengages the drive belt on one side before applying the brake to said side. The current system does not apply any increased load to the engine or drive train. Low speed auto brake steer is used for a pivot turn, where one track is locked and the other drives the vehicle. This is typically used to steer at slower speeds, in one alternative speeds below about 8 kmh$^{-1}$ and/or below about 5% of maximum forward speed of the vehicle. Brakes may also be used to steer at tighter radii than possible with sheave ratios. Brakes cannot be applied until the sheaves are disengaged with the V belt(s). The brake on one side of the vehicle is applied when the side shift arm reaches a maximum position. A left turn occurs when the left shift arm moves to the full left position stopping at the brake cylinder. In one embodiment, a pair of forward, neutral, reverse (FNR) gearboxes is required to perform a zero turn wherein a first track rotates in one direction and a second track rotates in a reverse direction of the first track simultaneously. As an example, the vehicle may be moving forward with both sides engaged in forward movement. When the user wants to perform a zero turn, the user may disengage one side to neutral position and move the other side to reverse. A second possibility involves the user shifting both sides to neutral and then simultaneously shifting one side into forward and the other side into reverse, causing a zero turn. In any of the above scenarios, the user may initiate the turn when the vehicle is stationary or moving. A preferred embodiment further includes 2 separate controllers, one for each gearbox. A pair of gearboxes mounted to the outputs of the VRD also provides the option of a high/low gear ratio operation range. This further provides an option to change output speed ratios of the vehicle for different applications/situations, such as low speed high torque work vehicle or a high speed vehicle. FIG. 12A-12C depict the brake steering of the current system herein. In FIG. 12A, left and right brakes are disengaged (depicted by gap between shift arms and brake cylinder plunger) and V belts are disengaged. In FIG. 12B, left and right brakes are engaged (no gap between shift arms and brake cylinder plunger) and V belts are disengaged. In FIG. 12C, right brake is engaged, right V belt is disengaged, left brake is disengage and left V belt is engaged resulting in a right brake turn of the vehicle.

Referring now to FIGS. 13 through 18 a second embodiment shown generally as 300 of the continuously variable speed transmission and steering differential. Another embodiment of the present disclosure, a continuously variable speed transmission and steering differential, is shown generally as 300 and includes the following major components namely, drive axle (or central drive axle) 302, which is fixed to the chassis and rotates on bearings.

Drive axle 302 has mounted thereon left and right moveable drive sheaves 304, left and right fixed drive sheaves 306 (as means for transmitting rotational energy), left and right parallel shift arms 308 and cog pulley 310.

Figure 13:
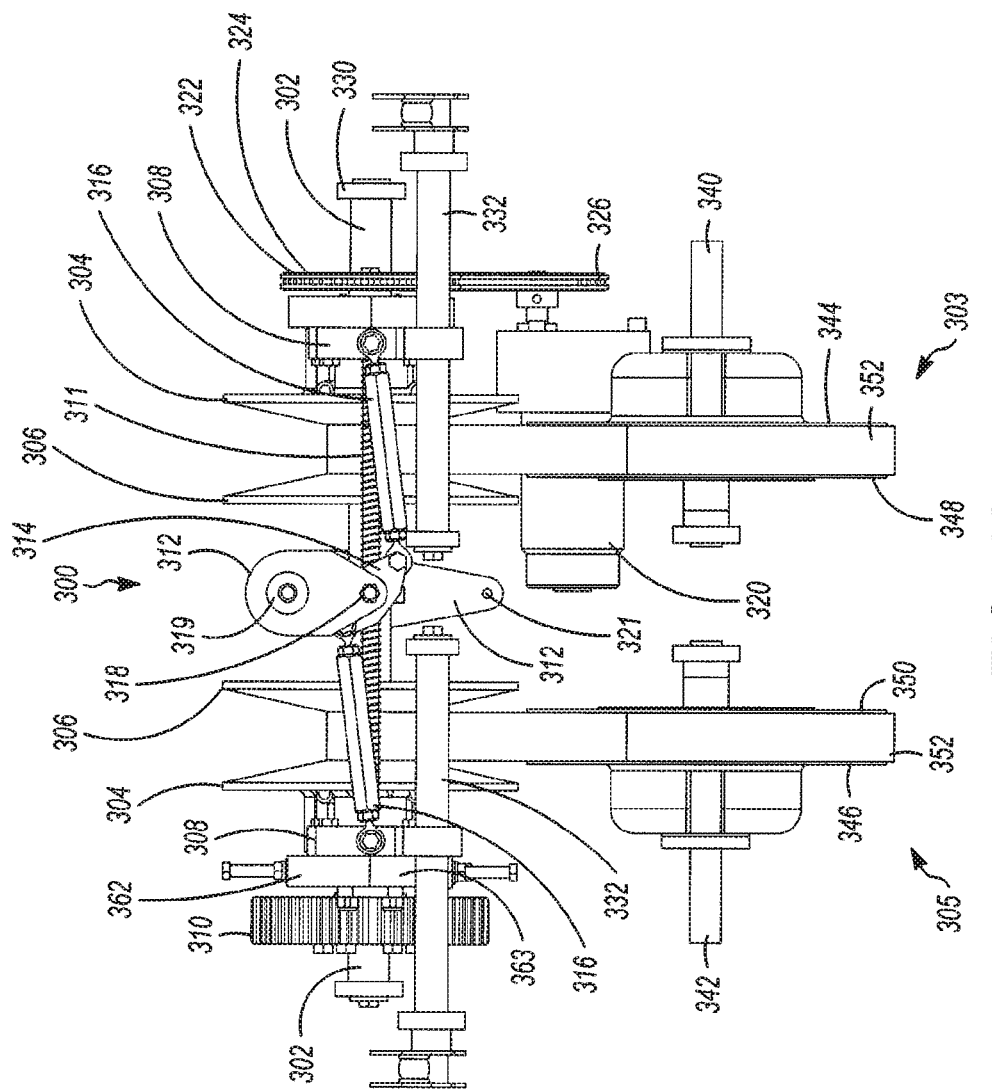
FIGS. 13-18 depict the continuous variable speed transmission and differential according to an exemplary embodiment.
Figure 14:
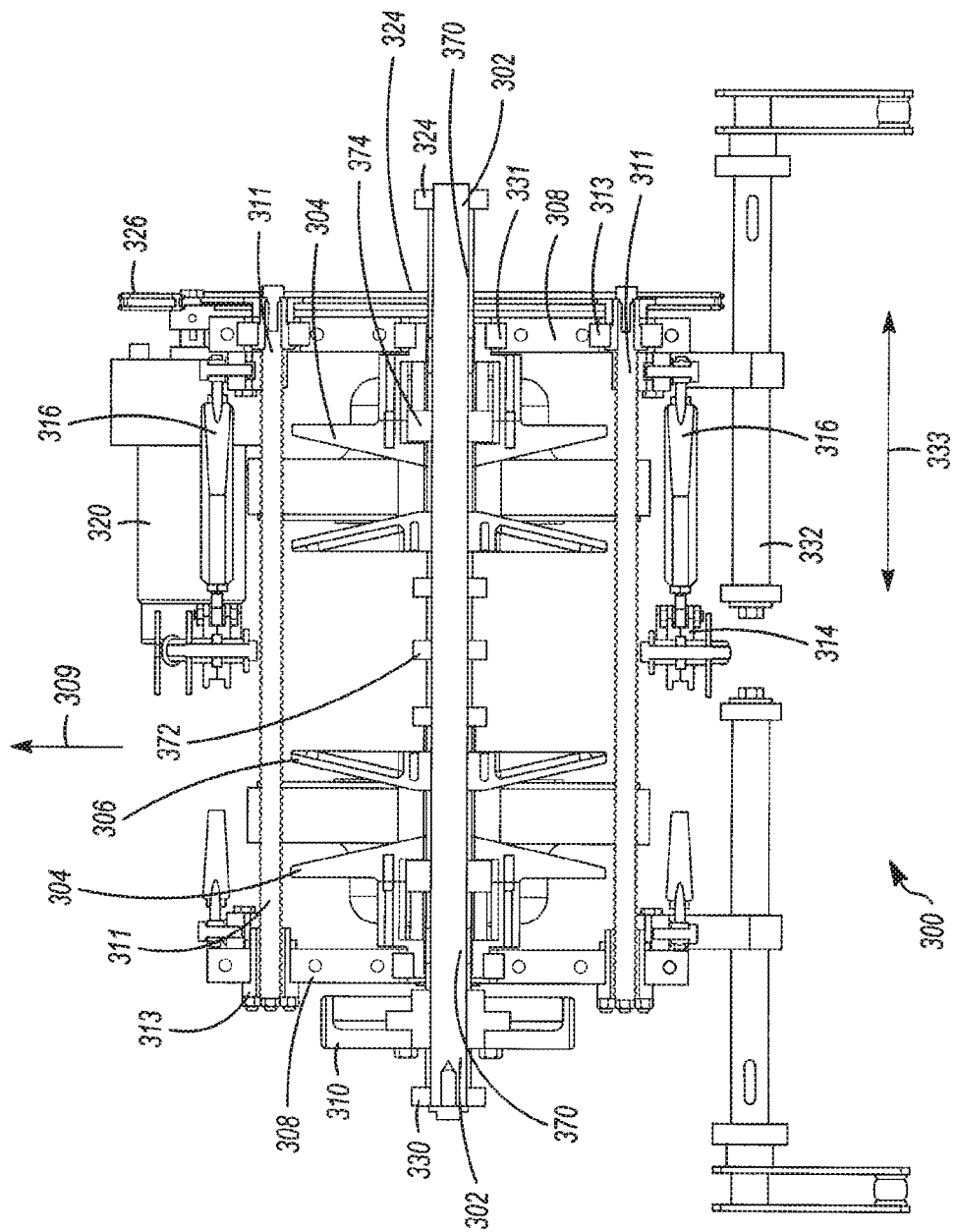
Figure 15:
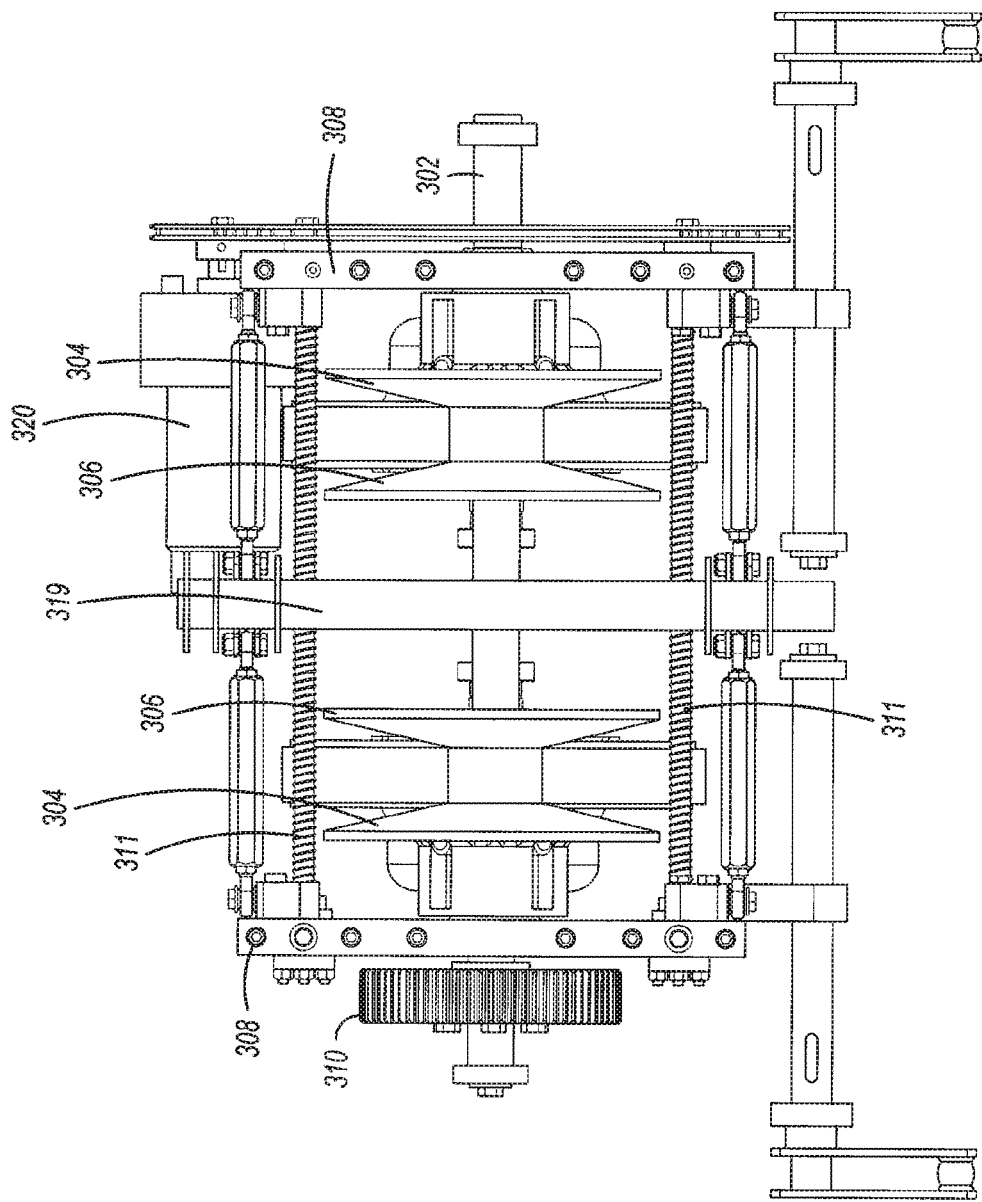
Figure 18:
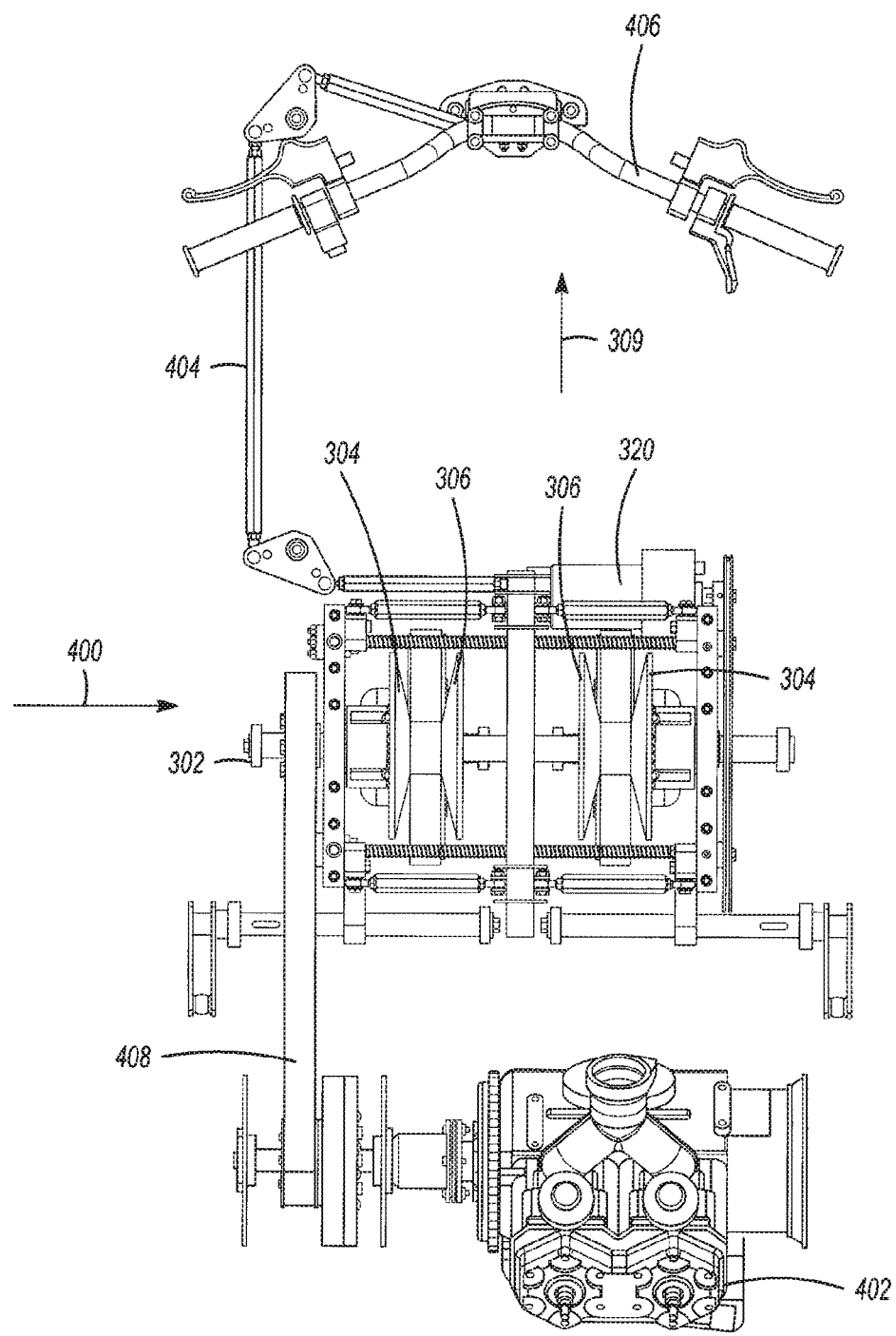

Cog pulley 310 receives a cog belt 408 from a motor (not shown) in FIGS. 13 and 14, which drives drive axle 302, but shown in FIG. 18 as propulsion motor (or power source) 402.

Continuously variable speed transmission and steering differential 300 includes two major mechanisms, namely, shift mechanism 303 and differential mechanism 305.

Shift mechanism 303 includes speed change motor 320, chain 324, sprockets 322, motor sprockets 326 shift arm cap 362 and shift arm base 363.

Speed change motor 320 receives signals from an operator to rotate motor sprocket 326, which in turn moves chain 324 and sprockets 322, which in turn rotate ball screw shafts 311, which in turn simultaneously move shift arms 308, thereby controlling the width or the spacing between the moveable drive sheaves 304 and the fixed drive sheaves 306, thereby effecting gear changes.

There are two moveable drive sheaves 304 on both the right and left side of the continuously variable speed transmission and steering differential 300.

By bringing shift arms 308 in closer proximity to each other by turning ball screw shafts 311 one can narrow the width between the moveable drive sheaves and the fixed drive sheaves 306 thereby increasing the gear ratio between the drive axle 302 and the right and left driven axles 340 and 342.

Figure 16:
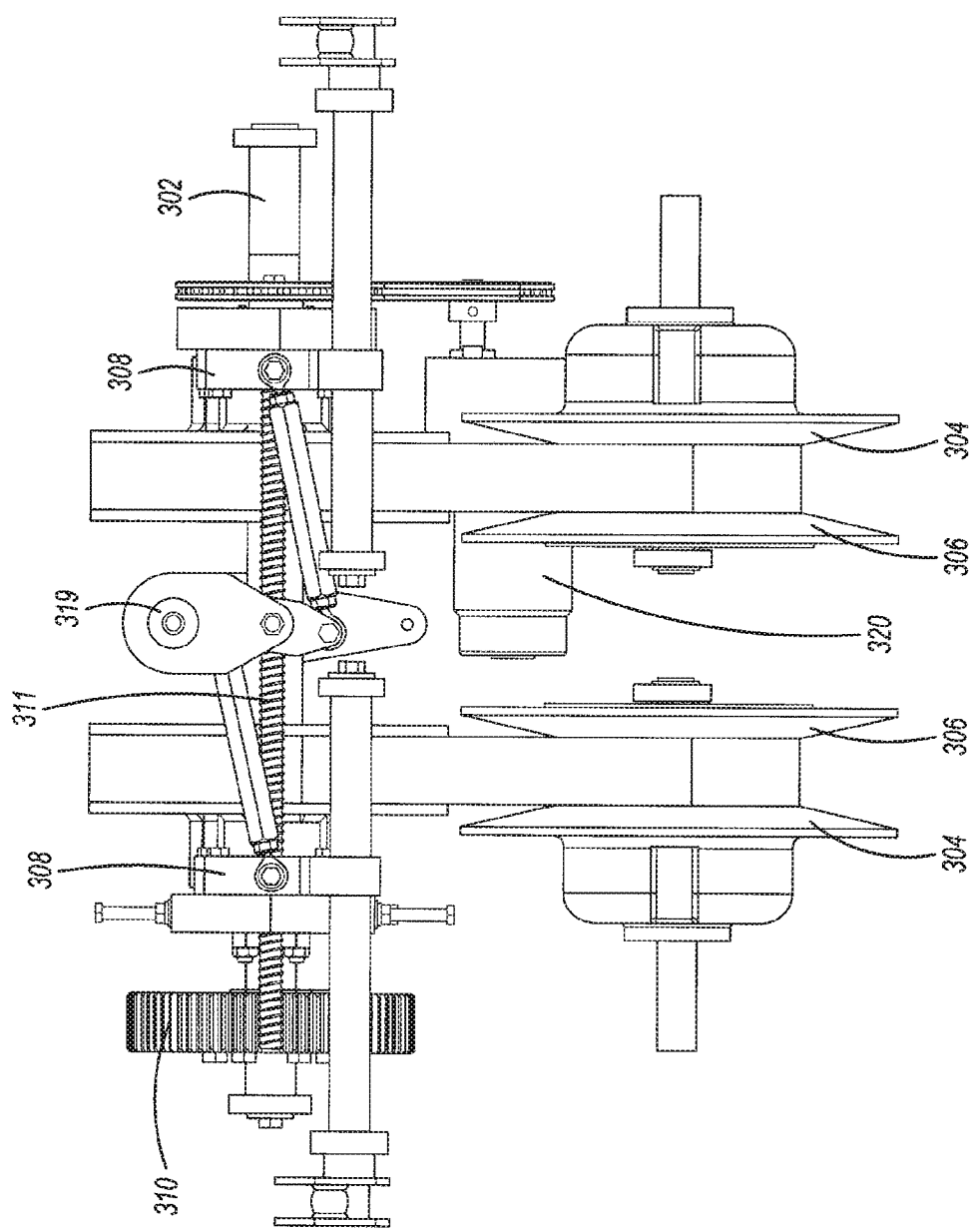

One can lower the gear ratio by reversing the direction of rotation of speed change motor 320, which in turn separates the left and right shift arms 308 thereby increasing the distance between the moveable drive sheaves 304 and the fixed drive sheaves 306. Low gear for example is shown in FIG. 13 and high gear is shown in FIG. 16. In FIG. 16 for example the drive sheaves are as close as possible together putting the continuously variable speed transmission and steering differential into the highest gear possible which would in turn provide for the highest speed at the driven axles 340 and 342. Referring now to FIG. 14, the drive sheaves 304, 306 are at their maximum separation, which is accomplished by moving the parallel shift arms 308 away from each other in the lateral direction 333 using the shift mechanism 303 as described above. In low gear as shown in FIG. 13 the right driven axle 340 and the left driven axle 342 are turned at their lowest speed possible in other words the continuously variable speed transmission and steering differential 300 is in the lowest gear and/or low gear. Therefore, moving the drive sheaves apart lowers the gear reduction to the driven axles 340 and 342 and moving the drive sheaves together increases the gear ratio to the right driven axle 340 and 342.

During the speed change operation shift mechanism 303 simultaneously moves both the left and right shift arms in unison such that the separation between the moveable drive sheaves 304 and the fixed drive sheaves 306 on both the left and right side remains the same. The amount of speed change will be the same on both the right driven axle 340 and the left driven axle 342.

A differential mechanism shown generally as 305 includes the following major components namely a differential arm 312, which is connected to a link arm 314 at the link arm pivot 318, which in turn is connected to left and right differential links 316 which in turn is connected to shift arms 308. Differential arms 312 are connected to a differential arm shaft 319 and rotate in unison.

By rotating differential arm shaft 319 either clockwise or counter clockwise this in turn will move shift arms 308 either to the left and/or to the right thereby increasing the distance between the moveable drive sheave 304 and the fixed drive sheave 306 on one side, for example the right side, and decreasing the distance between moveable drive sheave 304 and fixed drive sheave 306 on the other side namely the left side of the transmission.

Figure 19A:
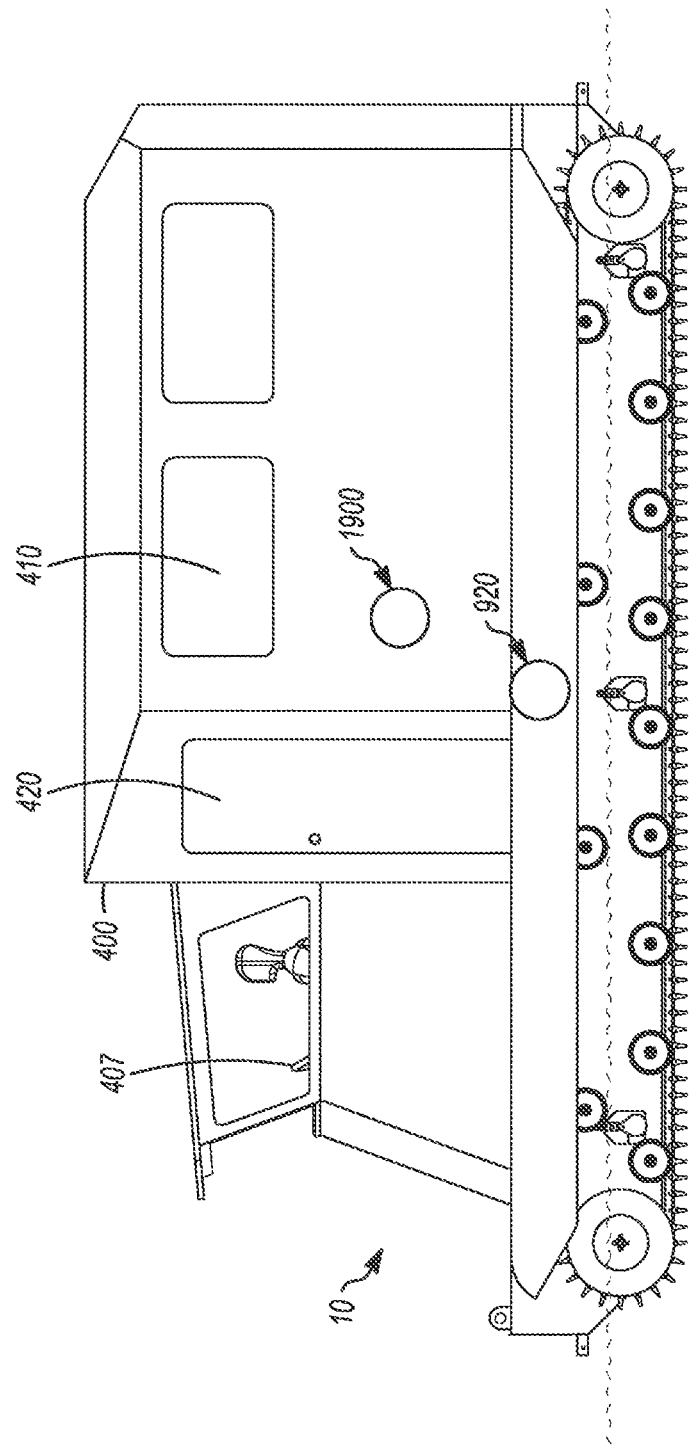
FIGS. 19A, 19B and 19C depict the vehicle enclosure according to an exemplary embodiment.

Differential arm shaft 319 which is in turn connected to front and back differential arms 312 is rotated at steering link point 321 through a series of links namely steering linkage 404 which ultimately is connected to either a set of handle bars 406 and/or steering wheel (407 see FIG. 19A).

On the driven side of the continuously variable speed transmission and steering differential 300 there is a right driven axle 340, a left driven axle 342, a right fixed driven sheave 344, a right moveable driven sheave 348, a left fixed driven sheave 346 and a left moveable driven sheave 350 having a V-belt 352 mounted thereon. In regard to the drive sheaves the inner drive sheaves are the fixed drive sheaves 306 wherein the out-drive sheaves are the moveable drive sheaves 304.

On the driven end, it is the exact opposite, namely, the moveable driven sheaves 348 and 350 are on the inside and the right and left fixed driven sheaves 344 and 346 are on the outside. In this manner, one can maintain belt alignment between the drive sheaves and the driven sheaves when changing gear ratios. V belt 352 connecting the drive sheaves to the driven sheaves is of constant length and therefore as the width of the drive sheaves increases the width of the driven sheaves decreases to maintain the correct tension on V belt 352.

FIG. 13, for example, shows maximum separation between the fixed drive sheave 306 and the moveable drive sheave 304 which would correspond to the lowest gear possible whereas the right fixed driven sheave 344 and right moveable driven sheave 348 are shown in the closest spacing possible again corresponding to the lowest gear ratio. FIG. 13 shows the shift mechanism 303 in the lowest gear ratio. FIG. 16 shows the sheaves 304 and 306 as close as possible and in a high gear position.

Figure 17:
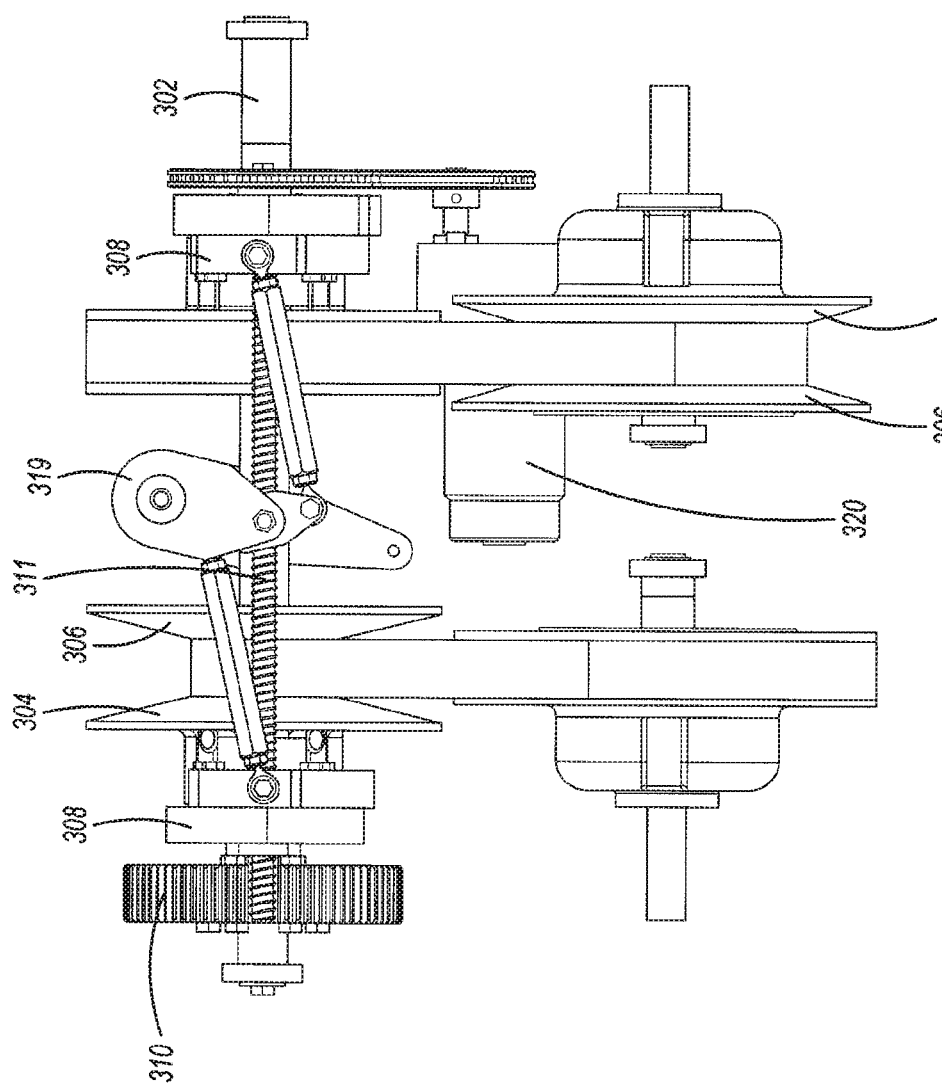

FIG. 13 also shows that the two sets of drive sheaves, namely the right and left moveable drive sheaves 304 and fixed drive sheaves 306, are equally spaced meaning that there is no differential or steering input and therefore the differential is neutral or in the straight ahead position. To input steering one would urge steering link point 321 either left or right which in turn would turn differential arm shaft 319, which in turn would turn differential arms 312, which in turn would move shift arms 308 either to the right or to the left, thereby inputting steering function. FIG. 17 shows maximum left turn differential input. In FIG. 17, the drive sheaves on the left hand side are in the lowest gear possible and the drive sheaves on the right hand side are in the highest gear possible therefore the right driven axle 340 will be turning at the maximum speed possible and the left driven axle 342 will be driven at the lowest speed possible therefore this will cause the vehicle to turn in a left hand turn since the right driven axle 340 is turning at a much greater speed than the left driven axle 342 thereby pivoting the vehicle to the left. In order to initiate a right hand turn the differential arm 312 would be pivoted in the opposite direction as shown in FIG. 17 and the gear ratios that are shown in FIG. 17 would essentially be reversed namely the right hand drive sheaves would be caused to become wider therefore putting it into a lower gear whereas the left drives sheaves would be brought closer together thereby putting them into a high gear such that the left driven axle 342 would be moving at a greater speed than the right driven axle 340 thereby pivoting the vehicle right creating a right hand turn.

Figure 13A:
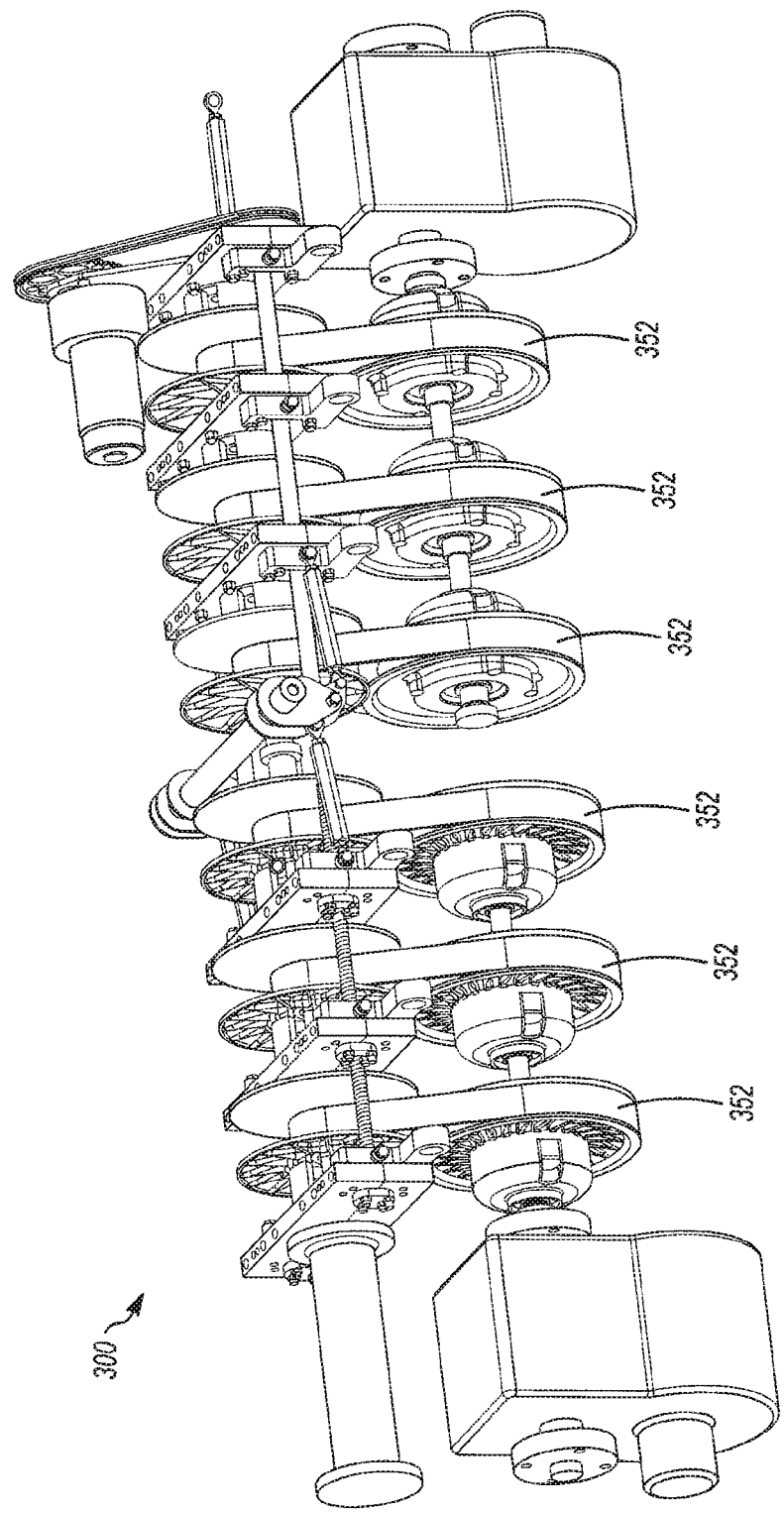

There is further anti-rotation and suspension axles 332, which have a double function: first of all, they provide for attachments to the rear suspension, and they also prevent rotation of the continuously variable speed transmission and steering differential structure. FIG. 13A depicts the continuously variable speed transmission and steering differential 300 with six V belts 352. This is a multi-belt version of the continuously variable speed transmission and steering differential 300.

Referring now to FIG. 14, which is a partial schematic cross-sectional view taken through the centre of drive axle 302 which shows that moveable drive sheave 304 (means for transmitting rotational energy from the drive axle 302) is attached to drive axle 302 with a keyed torque hub 374 which includes hub rollers 360.

Drive axle 302 is mounted onto drive axle bearing 331 and also bearings 330 on each end of the shaft. Sliding bushings 370 are mounted onto drive axle 302 and slide in the longitudinal direction 309 along drive axle 302 as required.

Ball screw shafts 311 are mounted on to shift arms 308 with ball screw bearings 313.

Additionally, drive axle 302 is also supported by centrally located drive axle bearing 372.

Figure 19B:
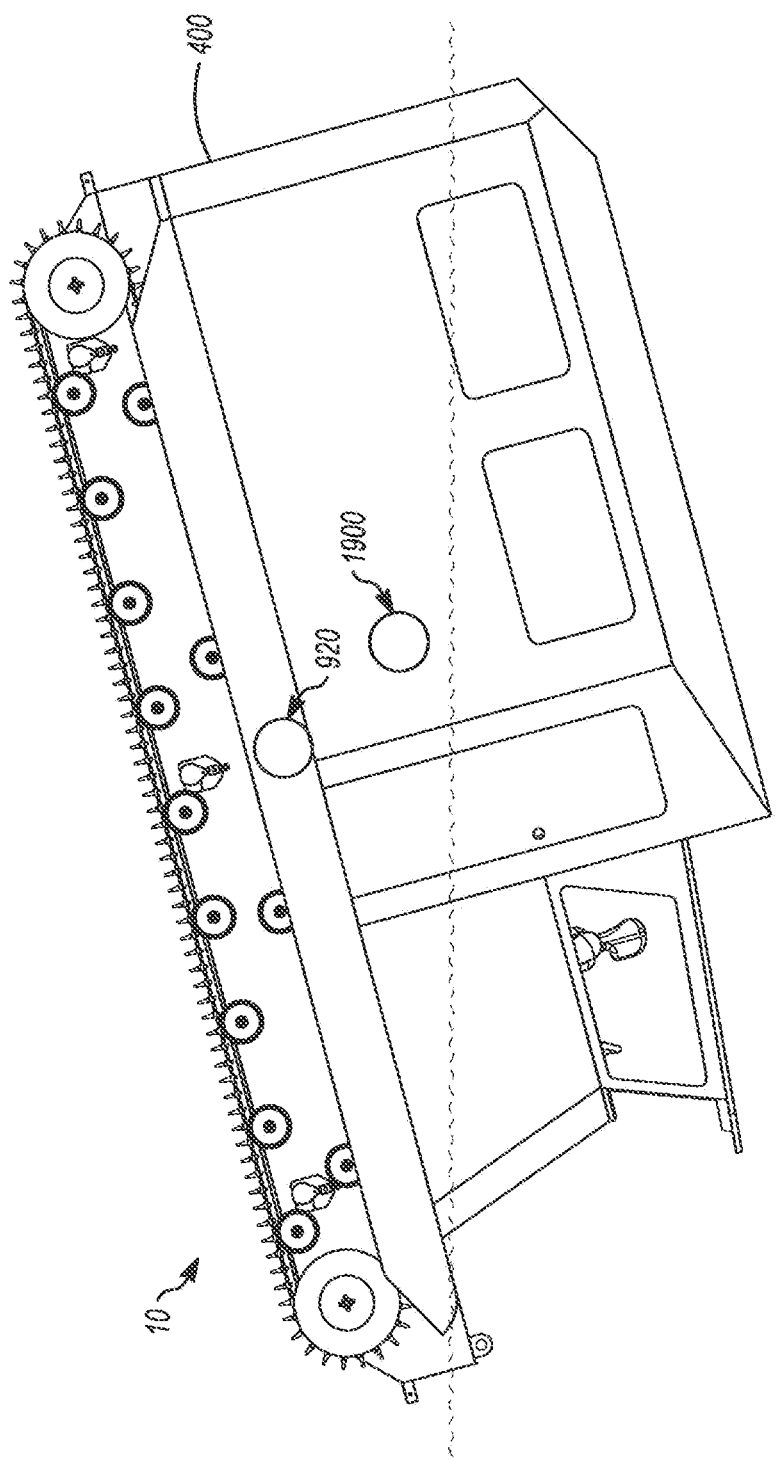
Figure 19C:
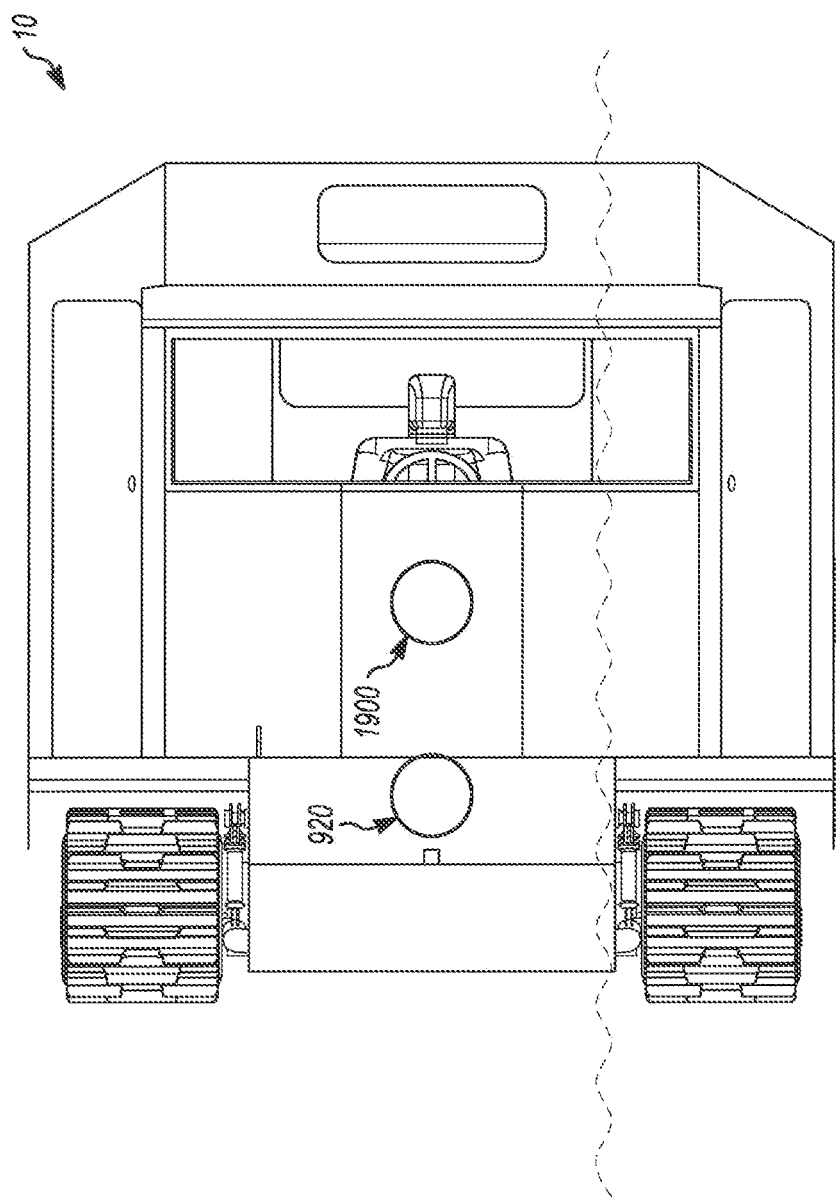

Referring now to FIGS. 19A, 19B and 19C, a further embodiment of the vehicle is shown with an enclosure 400 forming part of the amphibious vehicle 10. The enclosure may comprise at least one window 410 and at least one door 420. In an exemplary embodiment, the enclosure is detachable. In another exemplary embodiment, the vehicle includes a full enclosure serving several purposes including protection of the operator, vehicle and contents thereof (including any passengers) should the vehicle experience a rollover, and facilitating the vehicle to self-right in water when required. In another embodiment, the enclosure further replaces the need of a roll bar or roll cage. The structure of the enclosure should be strong and rigid to support the weight of the vehicle and contents thereof in the event of a rollover or the like. An exemplary material is Foam Core Carbon Fiber (FCCF), although other materials that minimize any water entering the cabin when the vehicle is not upright to allow auto roll back over to an upright position (i.e. self-righting or auto-righting). The enclosure in exemplary embodiments provides thermal insulation. The enclosure may further provide acoustic insulation. The thermal and acoustic insulation provides an increased comfort level to the operator and occupants of the vehicle. An exemplary method to attach the enclosure to the vehicle is the enclosure sandwiched between a pair of machined aluminum pockets, held in place with epoxy. These pockets have one of more holes in them to fasten the desired objects accordingly. There will be rows or a whole series of these pockets throughout the vehicle where ever an attachment point is required. Standard aviation L-track is the preferred mounting system to be bolted to these pockets. A foam or rubber seal will be used at the joint to make it water tight.

FIG. 19B depicts an exemplary embodiment of the vehicle 10 with the enclosure 400 of FIG. 19A when upside down in water. Because the center of mass is sufficiently above the waterline, the vehicle 10 is unlikely to remain in this position and any wave force of imbalance of weight would initiate the vehicle to roll over to the upright position.

FIG. 19C depicts an exemplary embodiment of the vehicle 10 on its side in the water. Similarly, given the center of mass is off center to the center of displacement, the vehicle 10 will seek to return to an upright position.

Figure 20:
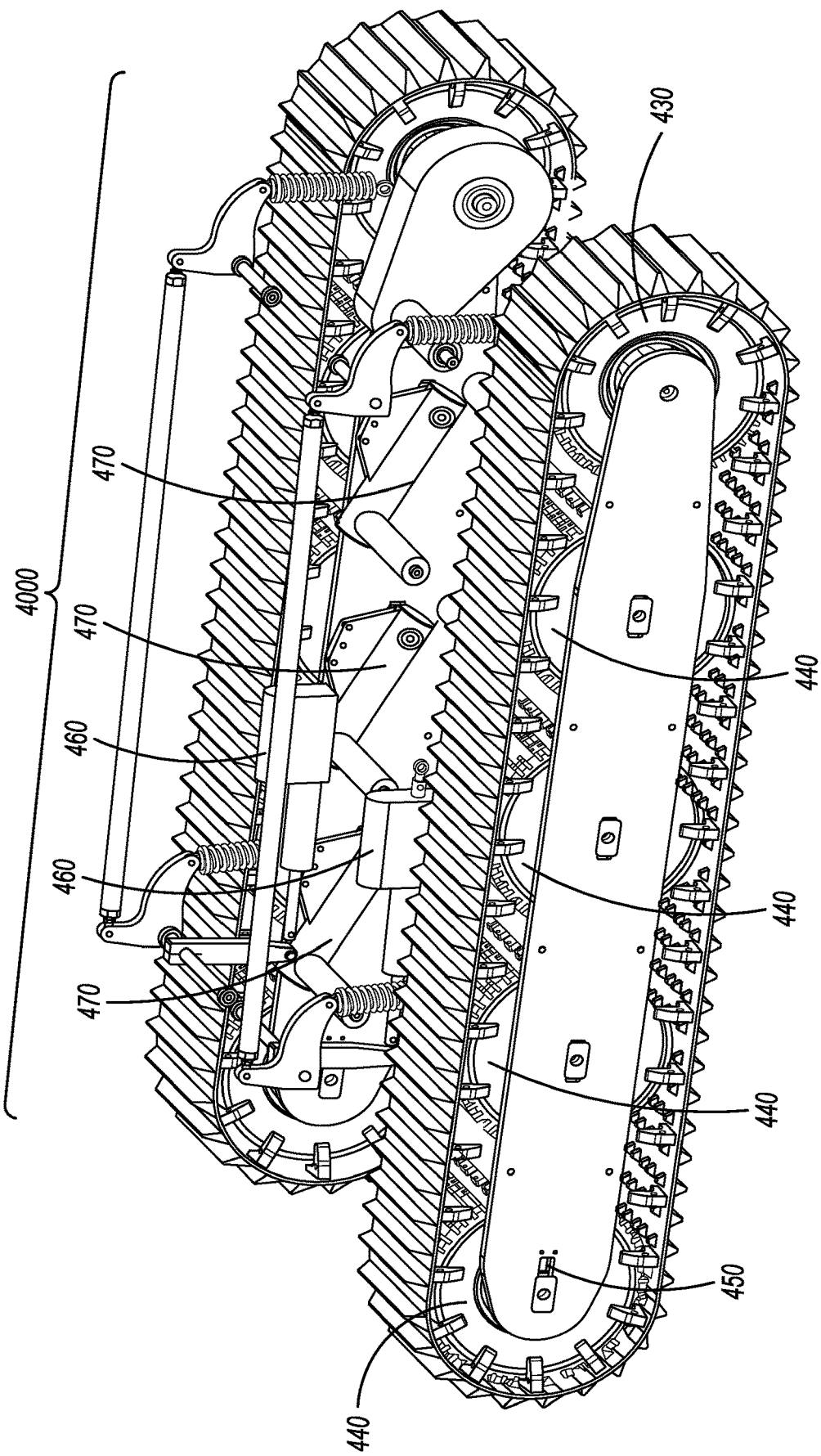
FIG. 20 depicts a further exemplary embodiment of the drive wheel and idler wheels.

FIG. 20 depicts a further exemplary embodiment of the drive wheel and idler wheels. In this exemplary embodiment, the drive wheel 430 and idler wheels 440 are tires, in exemplary embodiments, high speed tires. In exemplary embodiments, the tires have treads, which complement the internal cog pitch of the tracks. A preferred track is a track typically used in snowmobiles or the like. In one embodiment, the front idler wheel tire is connected to a tension system 450, in exemplary embodiments, a slotted tension system to allow tension adjustment of the tracks over the wheels. A predetermined amount of tension on the tracks reduces track and/or tire slip and reduces de-railing of the tracks during a tight or hard turn by said vehicle.

FIG. 20 depicts a power height and tilt system (or height suspension adjustment system) 4000 comprised of at least two independently operated linear actuator motors 460 for raising and lowering each track frame in unison via s-arms 470 with the other track frame or independent of the other track frame. When moved independent of the other track frame, the vehicle will tilt to one side. In one embodiment, the operator may control each linear actuator motor via an independent control, in exemplary embodiments, via a joystick like control. The linear actuator motors may be pneumatic, hydraulic or electric.

Figure 21:
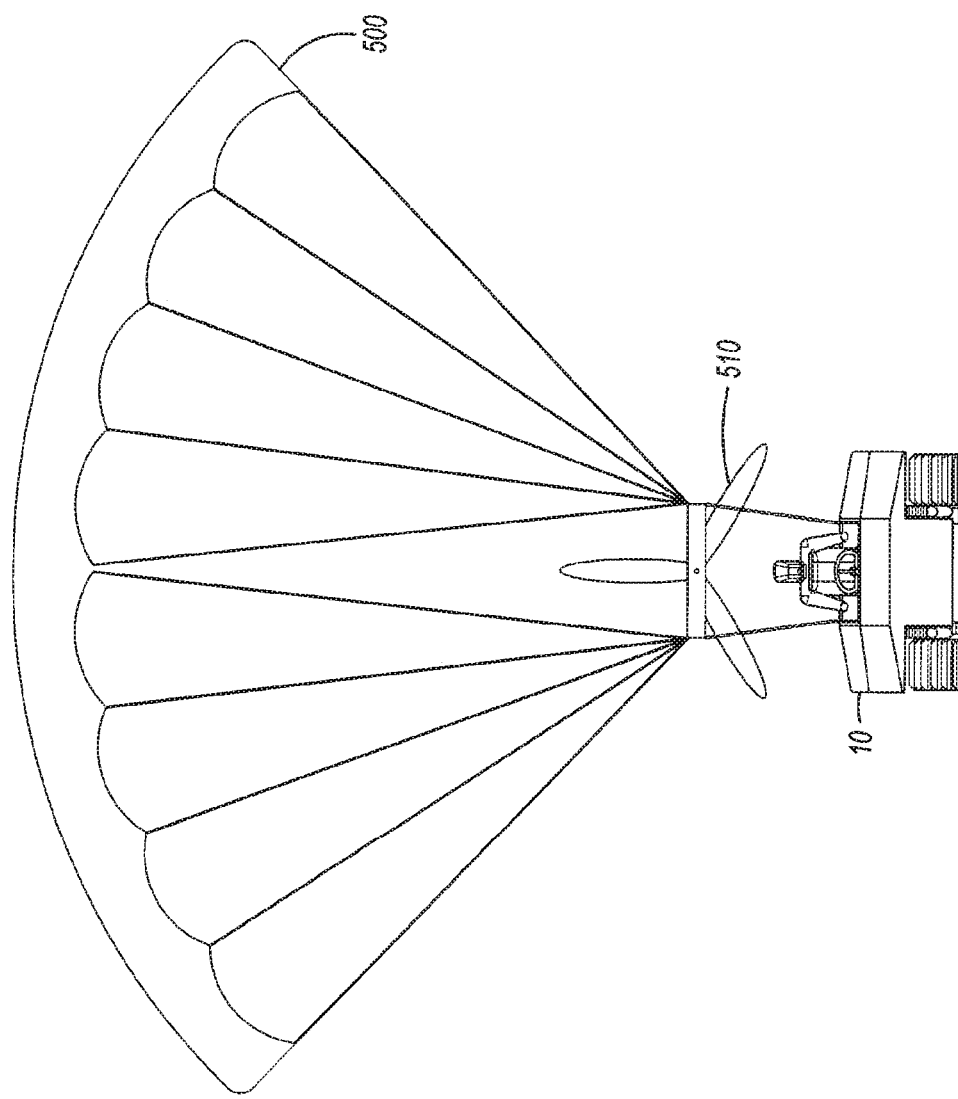
FIG. 21 depicts the parachute attached to the vehicle according to an exemplary embodiment.

FIG. 21 depicts the vehicle 10 according to yet another exemplary embodiment further comprising a parachute system 500 connectable to said vehicle 10. The parachute system 500 may be a standard parachute able to withstand the weight of the vehicle 10. In this embodiment, the parachute system comprises a power unit with a propeller 510 to facilitate movement of the vehicle in air. The parachute may be attached to the vehicle based on techniques know to a person of ordinary skill. A most common is 4 slings attached to each corner of the vehicle that rise up to a cross bar that connects all the strings attached to the parachute canopy. Another method would use 4 rigid arms instead of the 4 slings attached to each corner. The rigid arms may be beneficial for deployment from an aircraft or for take-off from the ground to hold all the canopy strings above the operator inside the vehicle.

Figure 22:
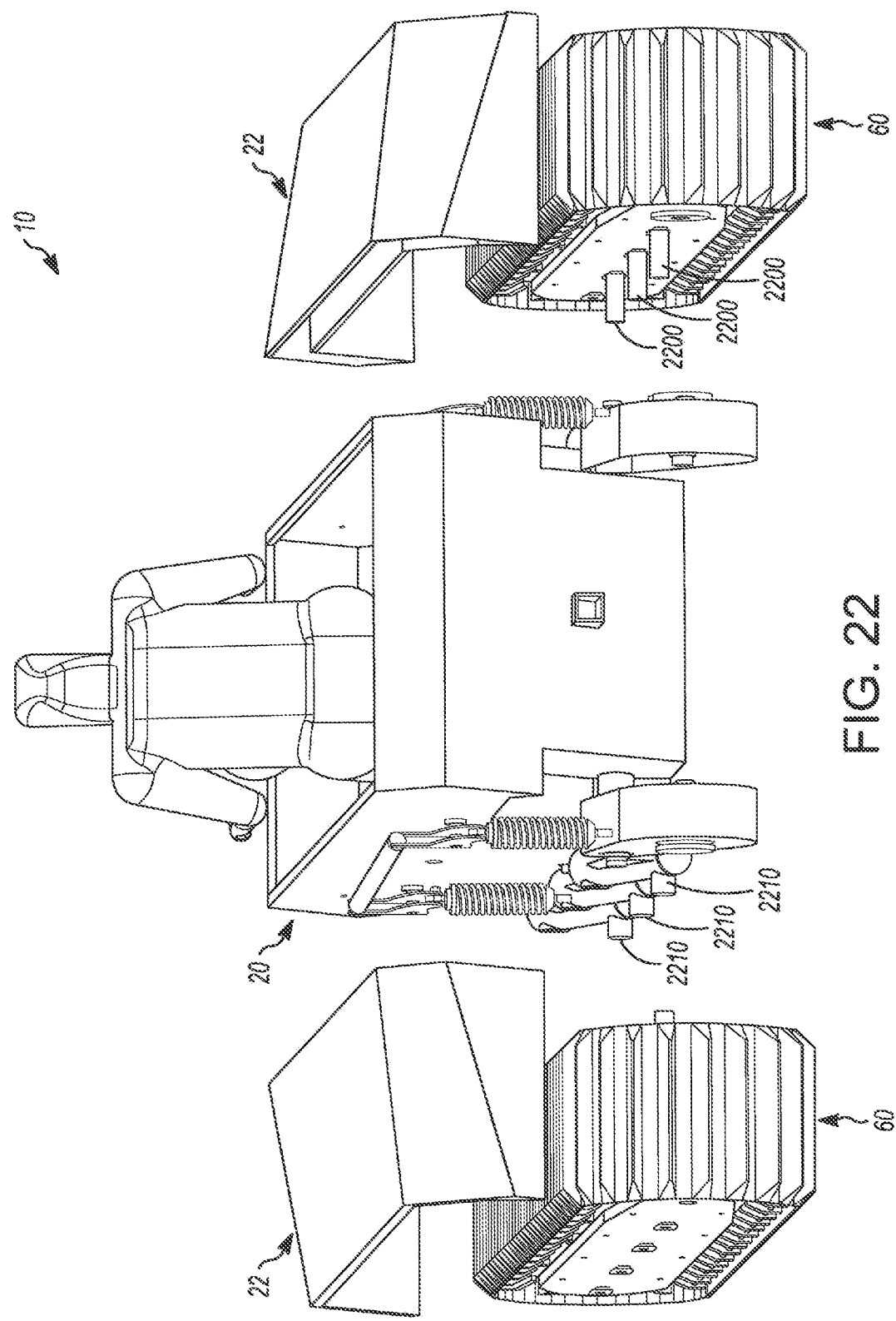
FIG. 22 depicts an exploded view of an exemplary embodiment of the vehicle with the tracks, track frames and fenders detached from the vehicle.

FIG. 22 depicts the vehicle in a modular stated wherein the fenders and tracks are detached from the hull to allow for ease in transportation and storage in confined spaces. The fender and tracks are quickly detached and reattached as required. For the removable fenders, a preferred method is as per the enclosure described above. The track frame may be detachably removed in one embodiment as follows: the track frame has an axle for each tire that is mounted to the track frame. Each axle slides into a mounting hole at the end of each S-arm. The axle is held in place with a large bolt that clamps the axle against a shoulder to secure it rigidly to the S-arm. 3 axles slide into 3 S-arm pockets and held in place with 3 bolts. The rear drive tire is mounted to a drive axle that mates to the swing arm drive axle using a pair of flanges.

The following is an example of an amphibious vehicle according to one embodiment.

Example 1—Speed on Land and Water

An amphibious vehicle according to one embodiment with 150 hp stock 800 cc snowmobile engine has achieved a land speed of 126 kmh$^{-1}$ and a water speed 77 kmh$^{-1}$. However, the vehicle is able to attain a land speed of 137 kmh$^{-1}$. An amphibious vehicle with 200 hp engine is expected to achieve a minimum land speed of 160 kmh$^{-1}$ and minimum water speed of 115 kmh$^{-1}$. An amphibious vehicle with higher hp is expected to achieve higher land and water speeds.

Improved rider comfort is achieved by the biasing means (suspension and shocks). Smooth operation is achieved by the combination of the biasing means (suspension and shocks) with the VRD controls which controls may be typical snowmobile controls (handlebar, thumb throttle, hand brake) or automobile controls (steering wheel, right foot throttle, left foot brake and joystick for height/tilt adjust). Furthermore, the VRD controls feedback to an operator provides the feel of driving an all-terrain vehicle. Automobile controls provides the feel of driving a car.

The following provides several examples of calculated wetted track volume to vehicle weight ratio with varying track lug height (track lug depth).

WTL×TTW×LH/Mass=in$^3$/lb. (cubic inches of water per pound of vehicle weight), (1 in$^3$=16.387 cm$^3$, 1 lb=0.454 kg, so 1 in$^3$/lb.=16.387 cm$^3$/0.4536 kg=36.127 cm$^3$/kg Acronym List WTL=Wetted Track Length at planing threshold
TTW=Total Track Width
LH=Lug Height
M=Mass of vehicle with operator and fuel
Exemplary vehicle specifications are:
WTL=73.5" (186.7 cm)
TTW=32" (81.3 cm)—(2 tracks×16"=32")
Varying LH=2.5" (6.35 cm), 2.0" (5.08 cm), 1.5" (3.81 cm), 1.25" (3.18 cm), 1.0" (2.54 cm), 0.875" (2.22 cm)
M=1150 lbs (521.6 kg)—(900 lbs+175 lb operator+75 lbs fuel=1,150 lbs)
Wetted track swept path volume to weight ratio:

Substitute formula for 2.5" (6.35 cm) LH, the ratio is 5.11 in$^3$/lb. (184.73 cm$^3$/kg)
Substitute formula for 2.0" (5.08 cm) LH, the ratio is 4.09 in$^3$/lb. (147.76 cm$^3$/kg)
Substitute formula for 1.5" (3.81 cm) LH, the ratio is 3.07 in$^3$/lb. (110.91 cm$^3$/kg)
Substitute formula for 1.25" (3.18 cm) LH, the ratio is 2.56 in$^3$/lb. (92.49 cm$^3$/kg)
Substitute formula for 1.0" (2.54 cm) LH, the ratio is 2.05 in$^3$/lb. (74.06 cm$^3$/kg)
Substitute formula for 0.875" (2.22 cm) LH, the ratio is 1.79 in$^3$/lb. (64.67 cm$^3$/kg). We have found a minimum of 1.80 in$^3$/lb (65 cm$^3$/kg) or greater is preferred for a tracked amphibious vehicle to result in a minimum amount of thrust relative to vehicle weight as calculated at the planing threshold for the vehicle to plane on water starting from a standstill position on water.

The planing threshold is where the horizontal drag force has reached a peak. Beyond this point, lift force is sufficient to raise the center of mass enough to begin reducing drag, by reducing the volume of water displaced. Due to forward momentum, the volume of water displaced is much more than just the wetted volume of water for the vehicle at rest.

As many changes can be made to the preferred embodiment of the disclosure without departing from the scope thereof; it is intended that all matter contained herein be considered illustrative and not in a limiting sense.

The invention claimed is:

1. An amphibious multi-terrain water planing tracked vehicle comprising:
   a. a hull having a top, a bottom, a front end, a rear end, a first side and a second side;
   b. at least one pair of track frames wherein one of said pair of track frames is mounted to said first side of said hull and another of said pair of track frames is mounted to said second side of said hull;
   c. a sole propulsion and water planing means comprising a continuous rotatable track having an outside surface and an inside surface, mounted to each of said pair of track frames;
   d. a drive system for driving each continuous rotatable track and for driving a steering system;
   wherein said amphibious multi-terrain water planing tracked vehicle when transitioning from land to water and vice versa requires no modification of said drive system or an exterior surface of said hull or said amphibious multi-terrain water planing tracked vehicle, and wherein said amphibious multi-terrain water planing tracked vehicle planes on water from a floating start position in water, and wherein said amphibious multi-terrain water planing tracked vehicle further comprises no external retractable device to increase lift of said amphibious multi-terrain water planing tracked vehicle, further wherein said hull and said at least one pair of track frames are buoyant, further wherein said continuous rotatable track is vertically adjustable relative to said hull.

2. The amphibious multi-terrain water planing tracked vehicle of claim 1 wherein said continuous rotatable track provides sufficient lift and thrust when planing on water to support the vehicle.

3. The amphibious multi-terrain water planing tracked vehicle of claim 1 wherein said continuous rotatable track along with said hull provide lift of said amphibious multi-terrain water planing tracked vehicle when travelling along water.

4. The amphibious multi-terrain water planing tracked vehicle of claim 1 wherein said hull while travelling on water after planing out is not in contact with a water surface and said continuous rotatable track acts as the sole producer of lift and propulsion along said water.

5. The amphibious multi-terrain water planing tracked vehicle of claim 1 with a combined track width to overall vehicle width ratio of from about from about 0.4:1 to about 0.95:1.

6. The amphibious multi-terrain water planing tracked vehicle of claim 1 with a combined track width to overall vehicle width ratio is from about 0.5:1 to about 0.95:1.

7. The amphibious multi-terrain water planing tracked vehicle of claim 1 with a combined track width to overall vehicle width ratio is from about 0.6:1 to about 0.95:1.

8. The amphibious multi-terrain water planing tracked vehicle of claim 1 wherein said amphibious multi-terrain water planing tracked vehicle has a ratio of lift producing overall track width to lift producing hull width of from about 0.5:1 to about 12:1.

9. The amphibious multi-terrain water planing tracked vehicle of claim 4 wherein said ratio of lift producing overall track width to lift producing hull width is about 1.23:1.

10. The amphibious multi-terrain water planing tracked vehicle of claim 1 wherein each of said continuous rotatable track further comprises a belt portion having sides and a plurality of track lugs on said belt portion, each of said plurality of track lugs extending out from an outer surface of said belt portion of said continuous rotatable track.

11. The amphibious multi-terrain water planing tracked vehicle of claim 1 wherein each of said continuous rotatable track further comprises a belt portion having sides and a plurality of track lugs on said belt portion, each of said plurality of track lugs extending out from an outer surface of said belt portion of said continuous rotatable track, wherein each of said plurality of track lugs has a track lug height of at least about 1.6 inches.

12. The amphibious multi-terrain water planing tracked vehicle of claim 1 wherein each of said continuous rotatable track further comprises a belt portion having sides and a plurality of track lugs on said belt portion, each of said plurality of track lugs extending out from an outer surface of said belt portion of said continuous rotatable track, wherein each of said plurality of track lugs has a track lug height of at least about 2.5 inches.

13. The amphibious multi-terrain water planing tracked vehicle of claim 1 wherein each of said continuous rotatable track further comprises a belt portion having sides and a plurality of track lugs on said belt portion, each of said plurality of track lugs extending out from an outer surface of said belt portion of said continuous rotatable track, wherein each of said plurality of track lugs has a truncated top triangle profile.

14. The amphibious multi-terrain water planing tracked vehicle of claim 1 wherein each of said continuous rotatable track further comprises a belt portion having sides and a plurality of track lugs on said belt portion, each of said plurality of track lugs extending out from an outer surface of said belt portion of said continuous rotatable track, wherein each of said plurality of track lugs has a truncated top triangle profile, wherein said truncated top triangle profile is selected from a group consisting of a truncated top triangle, and an incomplete truncated right angle triangle.

15. The amphibious multi-terrain water planing tracked vehicle of claim 10 wherein each of said plurality of track lugs has a truncated peak.

16. The amphibious multi-terrain water planing tracked vehicle of claim 10 wherein said truncated top triangle profile has a lead triangle side angle to said belt portion, when proximate water surface, for promoting movement of water on said lead triangle side away from said continuous rotatable track.

17. The amphibious multi-terrain water planing tracked vehicle of claim 10 wherein said truncated top triangle profile has a lead triangle side angle to said belt portion, when proximate water surface, for promoting movement of water on said lead triangle side away from said continuous rotatable track, wherein said lead triangle side angle further assists in propulsion of said amphibious multi-terrain water planing tracked vehicle in a desired direction.

18. The amphibious multi-terrain water planing tracked vehicle of any one of claim 10 wherein each of said plurality of track lugs is spaced apart from each other and further a number of said each of said plurality of track lugs are proximate a center of said belt and proximate the sides of said belt portion.

19. The amphibious multi-terrain water planing tracked vehicle of claim 10 wherein each of said plurality of track lugs is spaced apart from each other and further a number of said each of said plurality of track lugs are proximate a center of said belt and proximate the sides of said belt portion, wherein said plurality of track lugs proximate the center of said belt portion are shorter than said plurality of track lugs proximate the sides of said belt portion.

20. The amphibious multi-terrain water planing tracked vehicle of claim 10 wherein each of said plurality of track lugs is spaced apart from each other and further a number of said each of said plurality of track lugs are proximate a center of said belt portion and proximate the sides of said belt portion, wherein said plurality of track lugs proximate the center of said belt portion are taller than said plurality of track lugs proximate the sides of said belt portion.

21. The amphibious multi-terrain water planing tracked vehicle of claim 1 wherein said at least one continuous rotatable track further comprises at least one flange along a side thereof extending outward from the outside surface of said at least one continuous rotatable track; said at least one flange forming an inner side wall and an outer side wall along a length of said at least one continuous rotatable track.

22. The amphibious multi-terrain water planing tracked vehicle of claim 17 wherein said flange is integral with said continuous rotatable track.

23. The amphibious multi-terrain water planing tracked vehicle of claim 17 wherein said flange is detachable from said continuous rotatable track.

24. The amphibious multi-terrain water planing tracked vehicle of claim 17 wherein said flange is deformable.

25. The amphibious multi-terrain water planing tracked vehicle of claim 17 wherein said flange has a shape selected from a group consisting of: S, serpentine, zigzag, accordion and combinations thereof.

26. The amphibious multi-terrain water planing tracked vehicle of claim 1 further comprising a trailing edge proximate an end of said amphibious multi-terrain water planing tracked vehicle and said center of mass, with an angle formed from the trailing edge to the center of mass of from about 35 degrees or less.

27. The amphibious multi-terrain water planing tracked vehicle of claim 22 wherein said angle is from about 35 degrees to about −20 degrees.

28. The amphibious multi-terrain water planing tracked vehicle of claim 1 further comprising a center of mass and a center of buoyancy wherein the center of mass is proximate the center of buoyancy wherein any lift producing surface of said amphibious multi-terrain water planing tracked vehicle is optimal for planing on water.

29. The amphibious multi-terrain water planing tracked vehicle of claim 1 further comprising a continuously variable speed transmission and steering differential.

30. The amphibious multi-terrain water planing tracked vehicle of claim 29 wherein said continuously variable speed transmission and steering differential comprises:
   a. a laterally extending drive axle rotatably driven by a power source;
   b. a left pair of drive sheaves and a right pair of drive sheaves, mounted to the laterally extending drive axle; wherein each left pair and right pair of drive sheaves includes a fixed drive sheave and a laterally moveable drive sheave along the laterally extending drive axle;
   c. sheaves for transmitting rotational energy from the left pair of drive sheaves to a left driven axle and from the right drive sheaves to a right driven axle;
   d. two spaced apart longitudinally extending shift arms connected to the laterally moveable drive sheaves for controlling positioning of the laterally moveable drive sheaves;
   e. wherein narrowing or increasing a gap between the two spaced apart longitudinally extending shift arms narrows or increases respectively a gap between each left pair and right pair of drive sheaves and increases or decreases a gear ratio which increases or decreases speed of the drive axles, thereby providing speed control;
   f. wherein shifting the two spaced apart longitudinally extending shift arms either left or right varies a gear ratio between the left and right pair of sheaves which provides differential speed between the left and right driven axles thereby providing steering control; therefore speed control and steering control is simultaneously and independently effected by controlling position of the two spaced apart longitudinally extending shift arms.

31. The amphibious multi-terrain water planing tracked vehicle of claim 24 wherein the continuously variable speed transmission and steering differential further including;
   a. the continuously variable speed transmission includes a left pair of driven sheaves and a right pair of driven sheaves, mounted to the left and right driven axles respectively rotationally connected to the left and right pair of drive sheaves respectively;
   b. wherein each left pair and right pair of driven sheaves includes a fixed driven sheave and a moveable driven sheave such that a gap between each left pair and right pair of driven sheaves laterally varies inversely proportionally to a gap of each left pair and right pair of corresponding drive sheaves.

32. The amphibious multi-terrain water planing tracked vehicle of claim 25 wherein the two spaced apart longitudinally extending shift arms are longitudinally extending spaced apart parallel members.

33. The amphibious multi-terrain water planing tracked vehicle of claim 25 wherein the two spaced apart longitudinally extending shift arms are planar bars.

34. The amphibious multi-terrain water planing tracked vehicle of claim 25 wherein the two spaced apart longitudinally extending shift arms are connected with at least one ball screw shaft extending perpendicular to the two spaced apart longitudinally extending shift arms for controlling lateral spacing between the two spaced apart longitudinally extending shift arms by rotating the ball screw shaft.

35. The amphibious multi-terrain water planing tracked vehicle of claim 25 wherein the two spaced apart longitudinally extending shift arms are connected with two spaced apart ball screw shafts extending perpendicular to the two spaced apart longitudinally extending shift arms for controlling lateral spacing between the two spaced apart longitudinally extending shift arms by rotating the ball screw shafts.

36. The amphibious multi-terrain water planing tracked vehicle of claim 25 wherein the two spaced apart longitudinally extending shift arms are connected with at least one ball screw shaft extending perpendicular to the two spaced apart longitudinally extending shift arms for controlling lateral spacing between the two spaced apart longitudinally extending shift arms by rotating the ball screw shaft, wherein the ball screw shaft rotation is motor driven.

37. The amphibious multi-terrain water planing tracked vehicle of claim 25 wherein the two spaced apart longitudinally extending shift arms are connected with at least one ball screw shaft extending perpendicular to the two spaced apart longitudinally extending shift arms for controlling lateral spacing between the two spaced apart longitudinally extending shift arms by rotating the ball screw shaft, wherein the ball screw shaft is motor driven with sprockets mounted onto a end of the ball screw shaft and motor and inter-connected with a chain.

38. The amphibious multi-terrain water planing tracked vehicle of claim 25 further including a pivoting differential arm shaft connected to each of said two spaced apart longitudinally extending shift arms with differential links such that pivoting the pivoting differential arm shaft in one direction varies a gear ratio between the left and right pair of sheaves and pivoting in an opposite direction varies the gear ratio oppositely between the left and right pair thereby providing steering control.

39. The amphibious multi-terrain water planing tracked vehicle of claim 25 further including a pivoting differential arm shaft connected to each of said two spaced apart longitudinally extending shift arms with differential links such that pivoting the pivoting differential arm shaft in one direction varies a gear ratio between the left and right pair of sheaves and pivoting in an opposite direction varies a gear ratio oppositely between the left and right pair thereby providing steering control, wherein the pivoting differential arm shaft is connected to at least one differential arm which in turn is connected to a link arm pivoting about a link arm pivot, wherein each end of the link arm is connected to one end of a differential link thereby connecting the pivoting differential arm shaft to the two spaced apart longitudinally extending shift arms.

40. The amphibious multi-terrain water planing tracked vehicle of claim 25 wherein the continuously variable speed transmission and steering differential further including;
   a. the continuously variable speed transmission includes a left pair of driven sheaves and a right pair of driven sheaves, mounted to the left and right driven axles respectively rotationally connected to the left and right pair of drive sheaves respectively;
   b. wherein each left pair and right pair of driven sheaves includes a fixed driven sheave and a moveable driven sheave such that the gap between each left pair and right pair of driven sheaves laterally varies inversely proportionally to the gap of each left pair and right pair of corresponding drive sheaves, wherein the inner drive sheaves are fixed and the outer drive sheaves are moveable, and the inner driven sheaves are moveable and the outer driven sheaves are fixed.

41. The amphibious multi-terrain water planing tracked vehicle of claim 33 further including a pivoting differential arm shaft connected to each of said two spaced apart longitudinally extending shift arms with differential links such that pivoting the pivoting differential arm shaft in one direction varies a gear ratio between the left and right pair of sheaves and pivoting in an opposite direction varies a gear ratio oppositely between the left and right pair thereby providing steering control, wherein differential arm connected to a steering linkage which in turn is connected to a steering control such that actuating the steering control pivots the differential arm thereby providing steering control.

42. The amphibious multi-terrain water planing tracked vehicle of claim 25 wherein the laterally extending drive axle includes a cog pulley connected to a cog belt for receiving power from a power source.

43. The amphibious multi-terrain water planing tracked vehicle of claim 25 wherein the drive axles are connected to wheels.

44. The amphibious multi-terrain water planing tracked vehicle of claim 25 wherein the drive axles are connected to tracks.

45. The amphibious multi-terrain water planing tracked vehicle of claim 33 further including a pivoting differential arm shaft connected to each of said two spaced apart longitudinally extending shift arms with differential links such that pivoting the pivoting differential arm shaft in one direction varies a gear ratio between the left and right pair of sheaves and pivoting in an opposite direction varies the gear ratio oppositely between the left and right pair thereby providing steering control, wherein differential arm connected to a steering linkage which in turn is connected to a steering control such that actuating the steering control pivots the differential arm thereby providing steering control, wherein the steering control is selected from a group consisting of pivoting handle bars and steering wheel.

46. The amphibious multi-terrain water planing tracked vehicle of claim 25 wherein the laterally extending drive axle includes a cog pulley connected to a cog belt for receiving power from a power source, wherein the power source is an internal combustion motor.

47. The amphibious multi-terrain water planing tracked vehicle of claim 25 wherein the continuously variable speed transmission and steering differential further including;
  a. the continuously variable speed transmission includes a left pair of driven sheaves and a right pair of driven sheaves, mounted to the left and right driven axles respectively rotationally connected to the left and right pair of drive sheaves respectively;
  b. wherein each left pair and right pair of driven sheaves includes a fixed driven sheave and a moveable driven sheave such that the gap between each left pair and right pair of driven sheaves laterally varies inversely proportionally to the gap of each left pair and right pair of corresponding drive sheaves, wherein the continuously variable speed transmission further includes two v-belts rotationally connecting the left drive sheaves to the left driven sheaves and the right drive sheaves to the right driven sheaves.

48. The amphibious multi-terrain water planing tracked vehicle of claim 1 further comprising a trailing edge proximate an end of said amphibious multi-terrain water planing tracked vehicle and a center of mass, with an angle formed from the trailing edge to the center of mass of from about 35 degrees or less, a trailing edge water diverter integral with said hull providing an unobstructed path for water sprayed off said continuous rotatable tracks to be directed away from said amphibious multi-terrain water planing tracked vehicle.

49. The amphibious multi-terrain water planing tracked vehicle of claim 42 wherein said trailing edge water diverter further minimizes water sprayed off said continuous rotatable tracks contacting said amphibious multi-terrain water planing tracked vehicle.

50. The amphibious multi-terrain water planing tracked vehicle of claim 42 wherein said unobstructed path forms a minimum angle of about 40 degrees from a trailing edge of said continuous rotatable tracks to a trailing edge of said amphibious multi-terrain water planing tracked vehicle.

51. The amphibious multi-terrain water planing tracked vehicle of claim 42 wherein said integral trailing edge water diverter extends beyond said continuous rotatable track a minimum of about 40 degrees in relation to an angle formed between a wetted lift producing track surface and a tangent line at a trailing edge of a rotation track travel starting point.

52. The amphibious multi-terrain water planing tracked vehicle of claim 42 wherein said trailing edge water diverter extends below a water surface when said amphibious multi-terrain water planing tracked vehicle is in water further reducing water flow from feeding into a top side of said continuous rotatable track.

53. The amphibious multi-terrain water planing tracked vehicle of claim 42 wherein said trailing edge water diverter further comprises a rubber flap extending from said trailing edge water diverter to proximate said continuous rotatable track.

54. The amphibious multi-terrain water planing tracked vehicle of claim 42 wherein said trailing edge water diverter for reducing:
  a. water at the trailing edge from recirculating back to said amphibious multi-terrain water planing tracked vehicle; and
  b. reducing hydrodynamic drag and/or parasitic drag during planing and/or traveling on water.

55. The amphibious multi-terrain water planing tracked vehicle of claim 42 wherein said trailing edge water diverter further comprises a rubber flap extending from said trailing edge water diverter to proximate said continuous rotatable track, wherein said rubber flap forms an angle from a bottom of the trailing edge of the track from between about 0 degrees to about 90 degrees.

56. The amphibious multi-terrain water planing tracked vehicle of claim 42 wherein said trailing edge water diverter further comprises a rubber flap extending from said trailing edge water diverter to proximate said continuous rotatable track, wherein said rubber flap forms an angle from a bottom of the trailing edge of the track of about 30 degrees.

57. The amphibious multi-terrain water planing tracked vehicle of claim 1 with a track loading of 0.80 psi or less calculated by total vehicle weight/total flat surface area in contact with a ground surface.

58. The amphibious multi-terrain water planing tracked vehicle of claim 1 with a track lift producing wetted area having a pressure from about 0.1 psi to about 1.1 psi at water planing threshold.

59. The amphibious multi-terrain water planing tracked vehicle of claim 52 wherein the pressure is from about 0.25 psi to about 0.70 psi at water planing threshold.

60. The amphibious multi-terrain water planing tracked vehicle of claim 1 further comprising a tilt adjustment system.

61. The amphibious multi-terrain water planing tracked vehicle of claim 54 wherein said tilt adjustment system is selected from manual and powered.

62. The amphibious multi-terrain water planing tracked vehicle of claim 54 further comprising a power height and tilt system.

63. The amphibious multi-terrain water planing tracked vehicle of claim 1 further comprising a power height and tilt system.

64. The amphibious multi-terrain water planing tracked vehicle of claim 1 further comprising a minimum wetted track volume of water contained within a swept path to vehicle weight ratio defined by Wetted Track Length (WTL) at planing threshold multiplied by Total Track Width (TTL) multiplied by Lug Height (LH) divided by Mass (M) of vehicle including operator and fuel for planing on water without need of additional lift devices.

65. The amphibious multi-terrain water planing tracked vehicle of claim 58 wherein the minimum wetted track volume of water to vehicle weight ratio is at least about 1.8 in$^3$/lb.

66. The amphibious multi-terrain water planing tracked vehicle of claim 1 wherein said continuous rotatable track comprises a plurality of connectable linkable segments forming a continuous track.

67. The amphibious multi-terrain water planing tracked vehicle of claim 1 further comprising a rear drive track system using at least one of a swing arm or a pivot arm.

68. The amphibious multi-terrain water planing tracked vehicle of claim 1 further comprising a left and right S arm for a front track suspension position and a left and right rear swing arm.

69. The amphibious multi-terrain water planing tracked vehicle of claim 1 wherein said continuous rotatable track, when said amphibious multi-terrain water planing tracked vehicle is planing, is resilient forming a concave area on said continuous rotatable track along an underside of said amphibious multi-terrain water planing tracked vehicle.

70. The amphibious multi-terrain water planing tracked vehicle of claim 64 wherein the concave area runs along a length of said continuous rotatable track in contact with said water.

* * * * *